US012750855B2

(12) United States Patent
Raghavan et al.

(10) Patent No.: US 12,750,855 B2
(45) Date of Patent: Sep. 29, 2026

(54) METHODS FOR BEAM-DEPENDENT SCHEDULING OFFSET DETERMINATION

(71) Applicant: QUALCOMM Incorporated, San Diego, CA (US)

(72) Inventors: Vasanthan Raghavan, West Windsor Township, NJ (US); Sony Akkarakaran, Poway, CA (US)

( * ) Notice: Subject to any disclaimer, the term of this patent is extended or adjusted under 35 U.S.C. 154(b) by 313 days.

(21) Appl. No.: 18/419,929

(22) Filed: Jan. 23, 2024

(65) Prior Publication Data

US 2025/0240788 A1 Jul. 24, 2025

(51) Int. Cl.

| | |
|---|---|
| ***H04W 72/23*** | (2023.01) |
| ***H04B 7/06*** | (2006.01) |
| ***H04W 72/044*** | (2023.01) |

(52) U.S. Cl.

CPC .......... *H04W 72/23* (2023.01); *H04B 7/0617* (2013.01); *H04W 72/044* (2013.01)

(58) Field of Classification Search

CPC ............... H04W 72/23; H04W 72/044; H04W 72/0446; H04W 72/1263; H04B 7/0617; H04B 7/0695

USPC .......................................... 370/329–330, 336

See application file for complete search history.

(56) References Cited

U.S. PATENT DOCUMENTS

| | | | | |
|---|---|---|---|---|
| 2019/0261338 | A1* | 8/2019 | Akkarakaran | H04B 7/0619 |
| 2020/0389847 | A1* | 12/2020 | Deng | H04B 7/0617 |
| 2022/0070899 | A1* | 3/2022 | Huang | H04W 72/23 |
| 2022/0208470 | A1* | 6/2022 | Lee | H01G 4/30 |
| 2022/0346078 | A1* | 10/2022 | Raghavan | H04B 7/06952 |
| 2022/0361202 | A1* | 11/2022 | Yi | H04W 24/10 |
| 2022/0408470 | A1* | 12/2022 | Jung | H04B 7/06968 |
| 2023/0022915 | A1* | 1/2023 | Bhamri | H04B 7/0617 |
| 2023/0284277 | A1* | 9/2023 | Park | H04W 74/006 370/329 |
| 2024/0171332 | A1* | 5/2024 | Kwak | H04L 5/0048 |
| 2024/0244636 | A1* | 7/2024 | Prasad | H04L 5/0035 |
| 2024/0297764 | A1* | 9/2024 | Jang | H04L 5/0035 |
| 2025/0039701 | A1* | 1/2025 | Lee | H04B 17/17 |

* cited by examiner

*Primary Examiner* — Candal Elpenord

(57) ABSTRACT

This disclosure provides systems, methods, and devices for wireless communication that support beam-dependent scheduling offset determination and configuration. In a first aspect, a method of beam-dependent scheduling offset determination and configuration includes a user equipment (UE) receiving an allocation table including default uplink/downlink scheduling offsets. Upon receiving a scheduling message from a network entity, the UE transmits a beam-dependent scheduling offset message based on a processing state of the UE in an adaptive beamforming procedure. The network entity may use this message to calculate new scheduling offsets for the UE. The UE may then generate a beam using the determined adaptive beam weights and performs communications with the network entity. Other aspects and features are also claimed and described.

14 Claims, 11 Drawing Sheets

METHODS FOR BEAM-DEPENDENT SCHEDULING OFFSET DETERMINATION

TECHNICAL FIELD

Aspects of the present disclosure relate generally to wireless communication systems, and more particularly, to time domain resource configuration in wireless communications. Some features may enable and provide improved communications, including determination and configuration of beam-dependent scheduling offsets.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node-Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station or other network entity.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving a time domain resource allocation table including one or more default scheduling offsets for one of uplink communication or downlink communication, receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table, transmitting a beam-dependent scheduling offset message to the network entity, the beam-dependent scheduling offset message being based on a processing state of the UE in an adaptive beamforming procedure, generating a beam for one of the uplink communication or the downlink communication using one or more adaptive beam weights determined in the adaptive beamforming procedure, and performing the one of the uplink communication or the downlink communication using the beam at a beam-dependent scheduling offset, the beam-dependent scheduling offset corresponding to a time for the UE to complete the adaptive beamforming procedure from the processing state.

In an additional aspect of the disclosure, a UE configured for wireless communication is disclosed. The UE includes at least one processor, and a memory coupled to the at least one processor. The at least one processor is configured to receive a time domain resource allocation table including one or more default scheduling offsets for one of uplink communication or downlink communication, to receive a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table, to transmit a beam-dependent scheduling offset message to the network entity, the beam-dependent scheduling offset message being based on a processing state of the UE in an adaptive beamforming procedure, generating a beam for one of the uplink communication or the downlink communication using one or more adaptive beam weights determined in the adaptive beamforming procedure, and to perform the one of the uplink communication or the downlink communication using the beam at a beam-dependent scheduling offset, the beam-dependent scheduling offset corresponding to a time for the UE to complete the adaptive beamforming procedure from the processing state.

In an additional aspect of the disclosure, a UE configured for wireless communication is disclosed. The UE includes means for receiving a time domain resource allocation table including one or more default scheduling offsets for one of uplink communication or downlink communication, means for receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table, means for transmitting a beam-dependent scheduling offset message to the network entity, the beam-dependent scheduling offset message being based on a processing state of the UE in an adaptive beamforming procedure, means for generating a beam for one of the uplink communication or the downlink communication using one or more adaptive beam weights determined in the adaptive beamforming procedure, and means for performing the one of the uplink communication or the downlink communication using the beam at a beam-dependent scheduling offset, the beam-dependent scheduling offset corresponding to a time for the UE to complete the adaptive beamforming procedure from the processing state.

In an additional aspect of the disclosure, a non-transitory computer-readable medium stores instructions that, when executed by a processor at a UE, cause the processor to perform operations including receiving a time domain resource allocation table including one or more default scheduling offsets for one of uplink communication or downlink communication, receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table, transmitting a beam-dependent scheduling offset message to the network entity, the beam-dependent scheduling offset message being based on a processing state of the UE in an adaptive beamforming procedure, generating a beam for one of the uplink communication or the downlink communication using one or more adaptive beam weights determined in the adaptive beamforming procedure, and performing the one of the uplink communication or the downlink communication using the beam at a beam-dependent scheduling offset, the beam-dependent scheduling offset corresponding to a time for the UE to complete the adaptive beamforming procedure from the processing state.

In an additional aspect of the disclosure, a method of wireless communication includes transmitting to at least one UE a time domain resource allocation table including one or more default scheduling offsets for one of uplink communication or downlink communication, transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table, receiving a beam-dependent scheduling offset message from the at least one UE, determining a beam-dependent scheduling offset based on the beam-dependent scheduling offset message, and performing one of the uplink communication or the downlink communication using the beam-dependent scheduling offset.

In an additional aspect of the disclosure, a network entity configured for wireless communication is disclosed. The network entity includes at least one processor, and a memory coupled to the at least one processor. The at least one processor is configured to transmit to at least one UE a time domain resource allocation table including one or more default scheduling offsets for one of uplink communication or downlink communication, to transmit a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table, to receive a beam-dependent scheduling offset message from the at least one UE, to determine a beam-dependent scheduling offset based on the beam-dependent scheduling offset message, and to perform one of the uplink communication or the downlink communication using the beam-dependent scheduling offset.

In an additional aspect of the disclosure, a network entity configured for wireless communication is disclosed. The network entity includes means for transmitting to at least one UE a time domain resource allocation table including one or more default scheduling offsets for one of uplink communication or downlink communication, means for transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table, means for receiving a beam-dependent scheduling offset message from the at least one UE, means for determining a beam-dependent scheduling offset based on the beam-dependent scheduling offset message, and means for performing one of the uplink communication or the downlink communication using the beam-dependent scheduling offset.

In an additional aspect of the disclosure, a non-transitory computer-readable medium stores instructions that, when executed by a processor at a network entity, cause the processor to perform operations including transmitting to at least one UE a time domain resource allocation table including one or more default scheduling offsets for one of uplink communication or downlink communication, transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table, receiving a beam-dependent scheduling offset message from the at least one UE, determining a beam-dependent scheduling offset based on the beam-dependent scheduling offset message, and performing one of the uplink communication or the downlink communication using the beam-dependent scheduling offset.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
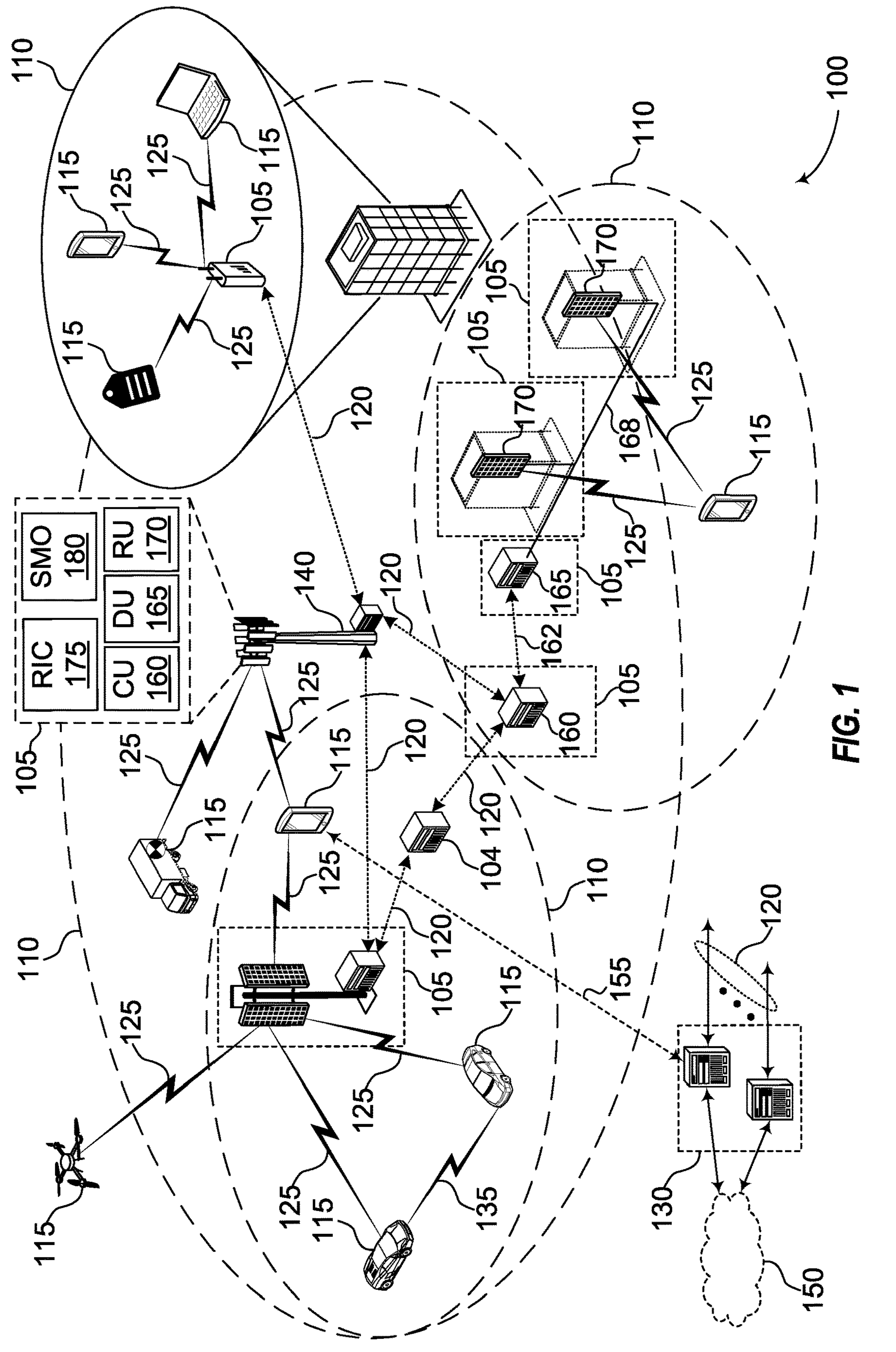
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support beam-dependent scheduling offset determination and configuration. Particular implementations of the subject matter described in this disclosure may be implemented to realize one or more of the following potential advantages or benefits. In some aspects, the present disclosure provides techniques for beam-dependent scheduling offset determination and configuration by allowing a UE performing adaptive beamforming to provide input to a network entity for determining minimum, beam-dependent scheduling offsets. Enabling use of adaptive beamforming allows for communications dynamically using beams outside of the fixed/finite number of beams stored in current codebook-based beamforming approach. A codebook-based beamforming approach typically corresponds to the use of a fixed/finite number of beam weights stored in a UE's radio frequency integrated circuit (RFIC) chip memory. Therefore, adaptive beamforming corresponds to beamforming in an "unconstrained" sense, wherein the beam weights are not a priori stored anywhere in the RFIC chip. These beam weights are determined dynamically according to channel conditions or in mission-mode operations. As a result, the determination/synthesis period for these adaptive beam weights could be non-constant/beam-dependent. The beam-dependent scheduling offset further improves the efficiency and reliability of the communications using the non-codebook-based beams by allowing distinct scheduling offsets for the determined adaptive beam weights. Because adaptive beamforming results in using non-codebook-based beams, common uplink/downlink scheduling offsets would be difficult to maintain for such beams.

This disclosure further relates generally to providing or participating in authorized shared access between two or more wireless devices in one or more wireless communications systems, also referred to as wireless communications networks. In various implementations, the techniques and apparatus may be used for wireless communication networks such as CDMA networks, TDMA networks, FDMA networks, OFDMA networks, SC-FDMA networks, LTE networks, GSM networks, 5G or 5G NR networks, as well as other communications networks. As described herein, the terms "networks" and "systems" may be used interchangeably.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports beam-dependent scheduling offset determination in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, the network entity 105 may be referred to as a network element, a mobility element, a radio access network (RAN) node, or network equipment, among other nomenclature. In some examples, the network entities 105 and the UEs 115 may wirelessly communicate via one or more communication links 125 (e.g., a radio frequency (RF) access link).

The UEs 115 may be dispersed throughout the coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be the network entity 105 (e.g., any network entity described herein), the UE 115 (e.g., any UE described herein), a network controller, an apparatus, a device, a computing system, one or more components, or another suitable processing entity configured to perform any of the techniques described herein. For example, a node may be the UE 115. As another example, a node may be the network entity 105.

In some examples, the network entities 105 may communicate with the core network 130, or with one another, or both. For example, the network entities 105 may communicate with the core network 130 via one or more backhaul communication links 120 (e.g., in accordance with an S1, N2, N3, or other interface protocol). In some examples, the network entities 105 may communicate with one another over the backhaul communication link 120 (e.g., in accordance with an X2, Xn, or other interface protocol) either directly (e.g., directly between the network entities 105) or indirectly (e.g., via the core network 130). In some examples, the network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, the midhaul communication links 162, or the fronthaul communication links 168 may be or include one or more wired links (e.g., an electrical link, an optical fiber link), one or more wireless links (e.g., a radio link, a wireless optical link), among other examples or various combinations thereof. The UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, the network entity 105 (e.g., the base station 140) may be implemented in an aggregated (e.g., monolithic, standalone) base station architecture, which may be configured to utilize a protocol stack that is physically or logically integrated within a single network entity 105 (e.g., a single RAN node, such as the base station 140).

In some examples, the network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, the network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. The RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The UE 115 may include or may be referred to as a mobile device, a wireless device, a remote device, a handheld device, or a subscriber device, or some other suitable terminology, where the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

When UE 115 refers to an IoT device, it may comprise a passive, semi-passive, or active IoT device, which may either have no on-device power or battery, or a power supply that operates the internal processing and control functionality, while using one or more forms of electromagnetic energy harvesting to power transmissions, such as through backscatter transmission. Such low or no-power IoT devices may also be referred to as ambient IoT devices. Such ambient IoT devices may receive RF signals from various forms of network entities, transmit-receive points (TRPs), or neighboring UE devices using sidelink communications. The ambient IoT device uses the electromagnetic energy in the RF signals to power transmissions. In some aspects, the ambient IoT device may store the received energy to immediately power its antenna array using a backscatter transmission or it may use the received energy to charge an onboard battery or other power source to use in transmissions.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of the UEs 115.

In some examples, the UE 115 may be able to communicate directly with other of the UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of the network entity 105 (e.g., the base station 140, the RU 170), which may support aspects of such D2D communications being configured by or scheduled by the network entity 105. In some examples, one or more UEs 115 in such a group may be outside of the coverage area 110 of the network entity 105 or may be otherwise unable to or not configured to receive transmissions from the network entity 105. In some examples, groups of the UEs 115 communicating via D2D communications may support a one-to-many (1:M) system in which each UE 115 transmits to each of the other ones of the UEs 115 in the group. In some examples, the network entity 105 may facilitate the scheduling of resources for D2D communications. In some other examples, D2D communications may be carried out between the UEs 115 without the involvement of the network entity 105.

In some systems, the D2D communication link 135 may be an example of a communication channel, such as a sidelink communication channel, between vehicles (e.g., the UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., the network entities 105, the base stations 140, the RUs 170) using vehicle-to-network (V2N) communications, or with both.

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between the UE 115 and the network entity 105 or the core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., the communication link 125, the D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
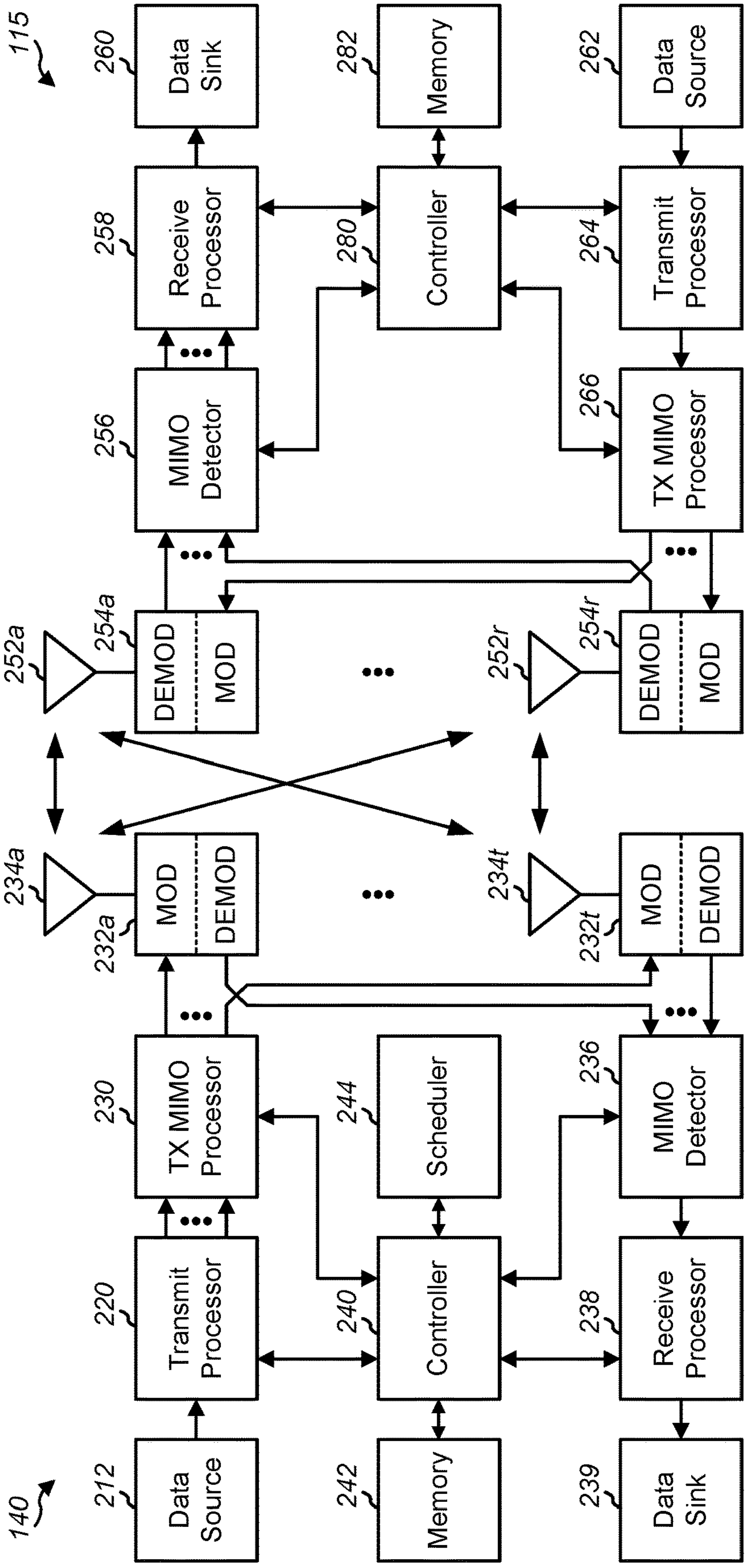
FIG. 2 is a block diagram illustrating examples of a base station and a user equipment (UE) according to one or more aspects.

FIG. 2 is a block diagram illustrating examples of the base station 140 and the UE 115 according to one or more aspects. The base station 140 and the UE 115 may be any of the network entities and base stations and one of the UEs in FIG. 1. For a restricted association scenario (as mentioned above), the network entity 105 may be small cell base station, and the UE 115 may be the UE 115 operating in a service area of the small cell base station, which in order to access the small cell base station, would be included in a list of accessible UEs for the small cell base station. The base station 140 may also be a base station of some other type. As shown in FIG. 2, a network entity 105, such as the base station 140 may be equipped with the antennas 234*a* through 234*t*, and the UE 115 may be equipped with the antennas 252*a* through 252*r* for facilitating wireless communications.

At the base station 140, the transmit processor 220 may receive data from the data source 212 and control information from the controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, the transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. The transmit (TX) MIMO processor 230 may perform spatial processing (e.g., precoding) on the data symbols, the control symbols, or the reference symbols, if applicable, and may provide output symbol streams to the modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from the modulators 232*a* through 232*t* may be transmitted via the antennas 234*a* through 234*t*, respectively.

At the UE 115, the antennas 252*a* through 252*r* may receive the downlink signals from the base station 140 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. The MIMO detector 256 may obtain received symbols from the demodulators 254*a* through 254*r*, perform MIMO detection on the received symbols if applicable, and provide detected symbols. The receive processor 258 may process (e.g., demodulate, deinterleave, and decode) the detected symbols, provide decoded data for the UE 115 to the data sink 260, and provide decoded control information to the controller 280, such as a processor.

On the uplink, at the UE 115, the transmit processor 264 may receive and process data (e.g., for a physical uplink shared channel (PUSCH)) from the data source 262 and control information (e.g., for a physical uplink control channel (PUCCH)) from the controller 280. Additionally, the transmit processor 264 may also generate reference symbols for a reference signal. The symbols from the transmit processor 264 may be precoded by the TX MIMO processor 266 if applicable, further processed by the modulators 254*a* through 254*r* (e.g., for SC-FDM, etc.), and transmitted to network entity 105. At the network entity 105, the uplink signals from the UE 115 may be received by the antennas 234, processed by the demodulators 232, detected by the MIMO detector 236 if applicable, and further processed by the receive processor 238 to obtain decoded data and control information sent by the UE 115. The receive processor 238 may provide the decoded data to the data sink 239 and the decoded control information to the controller 240.

The controllers 240 and 280 may direct the operation at the base station 140 and the UE 115, respectively. The controller 240 or other processors and modules at the base station 140 or the controller 280 or other processors and modules at the UE 115 may perform or direct the execution of various processes for the techniques described herein, such as to perform or direct the execution illustrated in FIGS. 4A and 4B, or other processes for the techniques described herein. The memories 242 and 282 may store data and program codes for the base station 140 and the UE 115, respectively. The scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negativeacknowledge (ACK/NACK) feedback for its own transmitted packets as a proxy for collisions.

Figure 3:
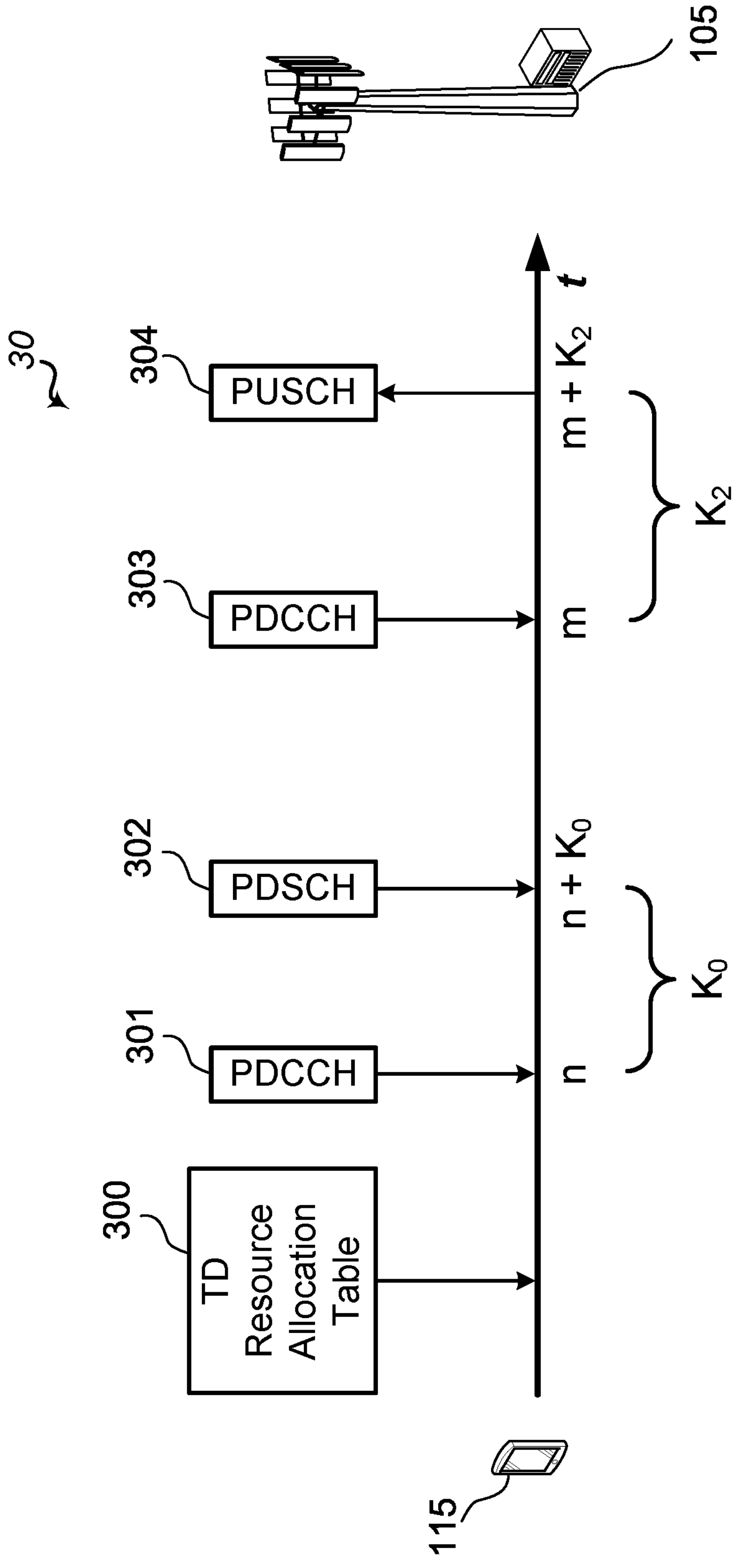
FIG. 3 is a block diagram illustrating a wireless network including a UE and network entity configured for uplink and downlink communications.

FIG. 3 is a block diagram illustrating a wireless network 30 including a UE 115 and network entity 105 configured for uplink and downlink communications. UE 115 may be configured with at least one time domain resource allocation table 300, which may be the default resource allocation table. Network entity 105 or another network entity may transmit time domain resource allocation table 300 to UE 115. In certain implementations, the time domain resource allocation table may have up to 16 rows in which each row identifies the scheduling parameters, including a mapping type, a scheduling offset (e.g., $K_0$ for PDSCH or $K_2$ for PUSCH), a starting symbol index(S), a number of symbols (L), and the like. In one example scenario, UE 115 may receive PDCCH 301 in slot n. PDCCH 301 may indicate a row index and downlink allocation corresponding to a PDSCH for UE 115. The row index may indicate the downlink scheduling offset, $K_0$, within time domain resource allocation table 300, which allows UE 115 to determine that a downlink transmissions, such as PDSCH 302, may be transmitted by network entity 105 in slot $n+K_0$. UE 115 would then monitor for PDSCH 302 in slot $n+K_0$. The additional information in the scheduling parameters of PDCCH 301 may also allow UE 115 to determine that PDSCH 302 is transmitted by network entity 105 on symbols S, S+1, S+(L−1) of slot $n+K_0$.

In another example scenario, UE 115 may receive PDCCH 303 in slot m which may indicate a row index and uplink resource grant corresponding to an uplink transmission opportunity, such as PUSCH 304, for UE 115. The row index may indicate the uplink scheduling offset, $K_2$, within time domain resource allocation table 300, which allows UE 115 to determine to transmit PUSCH 304 to network entity 105 in slot $n+K_2$. The additional information in the scheduling parameters of PDCCH 303 may also allow UE 115 to determine that PUSCH 304 may be transmitted to network entity 105 on symbols S, S+1, S+(L−1) of slot $n+K_2$.

Different UE implementations can have different capabilities allowing or disallowing the ability to change a receive or transmit beam when an uplink or downlink communication (PXSCH) is activated at the scheduling offset ($K_0$ or $K_2$). If a particular UE can change the receive or transmit beams before the corresponding scheduling offset included in the time domain resource allocation table, the UE can use the beam indicated by the TCI state identified in the scheduling message (e.g., DCI). If a particular UE cannot change receive or transmit beams before the corresponding scheduling offset included in the time domain resource allocation table, the UE can use a more conservative beam operation (e.g., PXSCH demodulation reference signals (DMRS) quasi-colocated (QCLed) with the uplink or downlink control messages (PXCCH) DMRS of the control resource set (CORESET) having the lowest $CORESET_{id}$).

Currently, the scheduling offsets, $K_0$ or $K_2$, are typically determined by a network entity without UE input into such determination. Network entity-determined scheduling offsets may be useful in the context of codebook-based RF beamforming at the UE side. However, as millimeter wave modems evolve, non-codebook based beamforming with adaptive/dynamic beam weights have been considered. In such a context, beam-dependent scheduling offsets, $K_0/K_2$, should be considered.

RF beamforming implementations at the UE side at millimeter wave frequencies is currently based on the use of codebook-based approaches. In such codebook-based approaches, coding for a finite number of beams are stored in the codebook in UE memory. For all the beams associated with the codebook, a common scheduling offset, $K_0/K_2$, can be determined. However, as modem technology evolves, and non-codebook based adaptive/dynamic beam weights are considered, the design of such beam weights consist of a beam synthesis period where beam weights are learned via channel measurements. The latency associated with a beam weight learning period can be antenna element-dependent, channel quality dependent, and the like. With objectives for adaptive beam weights also sometimes including side lobe suppression, the latency can be significant, as more measurements are often needed. In addition to the reference signal overhead, learning the overhead may also depend on the particular UE's capability because some signal processing operations could be slower in some categories of UEs (e.g., low/medium-tier) than others (higher-tier). Thus, a common scheduling offset, $K_0/K_2$, for all the adaptive beam weights becomes a difficult process to sustain, because there are multiple possibilities in terms of configuring scheduling offset values depending on the status of the adaptive beam weight learning and computation.

Figure 4A:
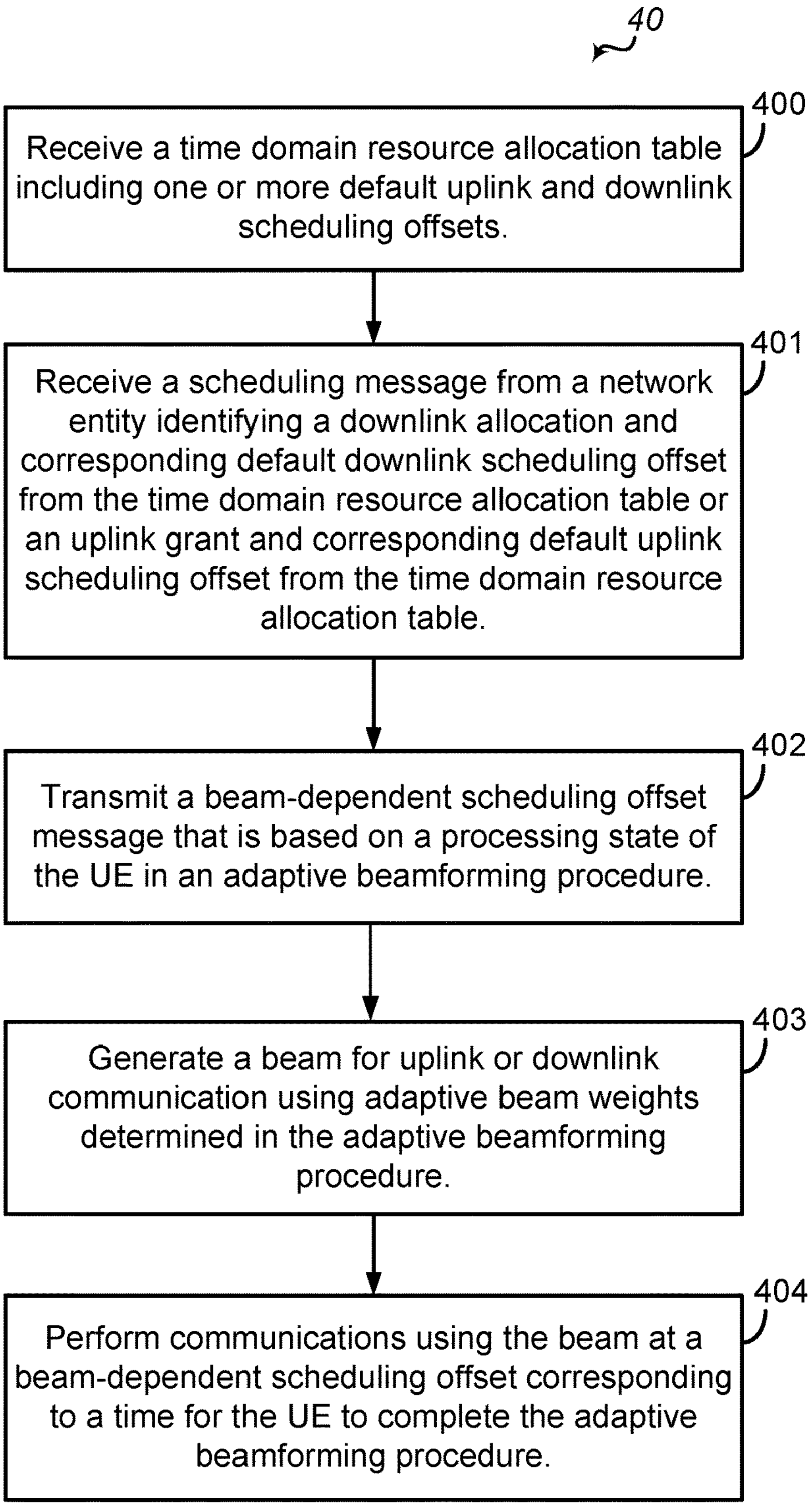
FIGS. 4A-4B are flow diagrams illustrating example processes that support beam-dependent scheduling offset determination and configuration according to one or more aspects.

FIG. 4A is a flow diagram illustrating an example process 40 that supports beam-dependent scheduling offset determination and configuration according to one or more aspects. Operations of process 40 may be performed by a UE, such as UE 115 described above with reference to FIG. 1, 2, 3, or a UE described with reference to FIG. 5. For example, example operations (also referred to as "blocks") of process 40 may enable UE 115 to support beam-dependent scheduling offset determination.

At block 400, a UE receives a time domain resource allocation table including one or more default scheduling offsets for one of uplink communication or downlink communication. The time domain resource allocation table includes a number of rows of scheduling parameters that may include parameters such as mapping type, uplink and downlink scheduling offsets, starting symbol, number of symbols, and the like. The allocation table configures the UE with candidate scheduling parameters that may be selected via later signaling.

At block 401, the UE receives a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table. The scheduling message (e.g., PDCCH, PUCCH) includes a row indicator that the UE uses to select the particular row within the time domain resource allocation table to identify the specific scheduling parameters to apply to the communication scheduled, whether uplink or downlink.

At block 402, the UE transmits a beam-dependent scheduling offset message to the network entity, the beam-dependent scheduling offset message being based on a processing state of the UE in an adaptive beamforming procedure. When configured according to aspects of the present disclosure, the UE is capable of performing adaptive beamforming. The adaptive beamforming procedure may be triggered by receipt of a scheduling message, whether it is initially triggered by the scheduling message received at the UE at block 401 or triggered upon receipt of an earlier scheduling message. When the UE initiates the adaptive beamforming procedure, it will begin taking signal measurements of successive reference signals from the network entity. The UE begins learning the conditions of the communication channel with the successive signal measurements until it has enough channel information to process into adaptive beam weights for beam generations. The entire beam synthesis period may differ depending on channel conditions or different transmission objectives, such as side lobe suppression. As the UE receives the scheduling message at block 401, it examines its processing state in the adaptive beamforming procedure and transmits the beam-dependent scheduling offset message to the network entity based on that processing state. The beam-dependent scheduling offset message may represent an actual minimum scheduling offset calculated by the UE based on its processing state or may represent an indication of processing state, which allows the network entity to calculate a new, beam-dependent scheduling offset.

At block 403, the UE generates a beam for one of the uplink communication or the downlink communication using one or more adaptive beam weights determined in the adaptive beamforming procedure. Once the beam synthesis period has completed and the UE has determined the adaptive beam weights, the UE generates the communication beam uses the determined adaptive beam weights.

At block 404, the UE performs the one of the uplink communication or the downlink communication using the beam at a beam-dependent scheduling offset, the beam-dependent scheduling offset corresponding to a time for the UE to complete the adaptive beamforming procedure from the processing state. After generating the beam with the adaptive beam weights, the UE conducts the scheduled communication, whether that is receiving a downlink transmission from the network entity or transmitting uplink control or data to the network entity, via the generated beam. The communication occurs at a beam-dependent scheduling offset which includes the beam synthesis period and potentially the time for preparing the uplink transmission.

Figure 4B:
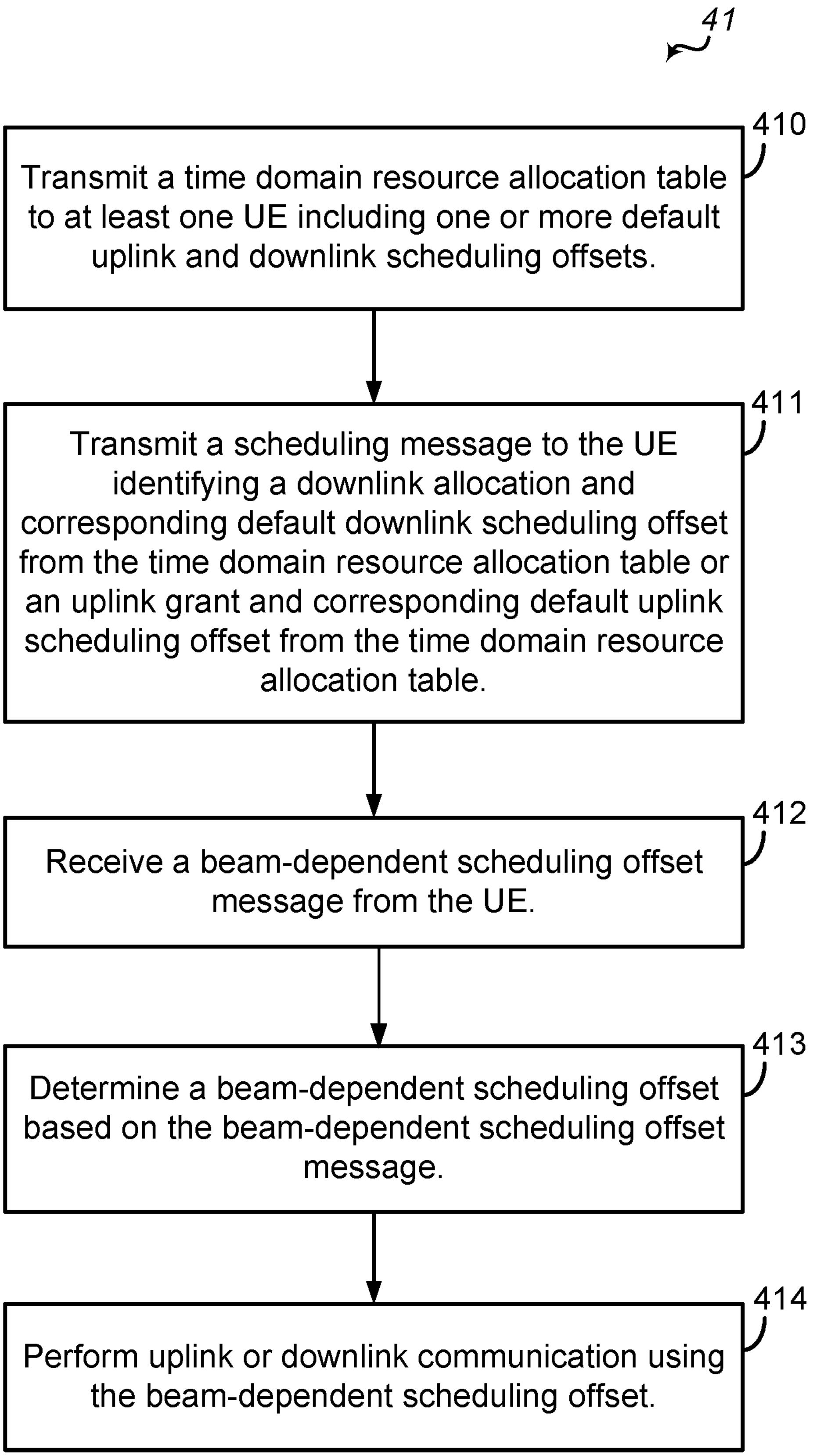

FIG. 4B is a flow diagram illustrating an example process 41 that supports beam-dependent scheduling offset determination and configuration according to one or more aspects. Operations of process 41 may be performed by a UE, such as UE 115 described above with reference to FIG. 1, 2, 3, or a UE described with reference to FIG. 5. For example, example operations (also referred to as "blocks") of process 41 may enable UE 115 to support beam-dependent scheduling offset determination.

At block 410, a network entity transmits to at least one UE a time domain resource allocation table including one or more default scheduling offsets for one of uplink communication or downlink communication. The network entity creates the time domain resource allocation table that provides candidate scheduling parameters associated with conditions of the wireless spectrum within the coverage area of the network entity. The network entity transmits this resource allocation table to configure the UE with parameters for operating within the communication spectrum.

At block 411, the network entity transmits a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table. In normal operation, the network entity may provide downlink scheduling or an uplink resource grant to the UE for receiving downlink transmissions or conduct uplink transmissions. The network entity transmits these scheduling messages to the UE to enable such communications.

At block 412, the network entity receives a beam-dependent scheduling offset message from the at least one UE. When the UE in communication with the network entity is capable of adaptive beamforming according to aspects of the present disclosure, the network entity would receive a beam-dependent scheduling offset message from the one or more capable UEs being scheduled by the network entity. The receipt of the beam-dependent scheduling offset message informs the network entity that the transmitting UEs are performing an adaptive beamforming procedure.

At block 413, the network entity determines a beam-dependent scheduling offset based on the beam-dependent scheduling offset message. As noted above, the beam-dependent scheduling offset message may include a specific, minimum scheduling offset as calculated by the UE. Alternatively, the beam-dependent scheduling offset message may include an indicator of the UE's processing state within the adaptive beamforming procedure. The network entity determines the beam-dependent scheduling offset by either using the specific, minimum scheduling offset received as the beam-dependent scheduling offset message or calculates the beam-dependent minimum scheduling offset using the knowledge of the state of processing the transmitting UE is in within the adaptive beamforming procedure.

At block 414, the network entity performs one of the uplink communication or the downlink communication using the beam-dependent scheduling offset. Depending on the processing state of the UE in the adaptive beamforming procedure, the beam-dependent scheduling offset may differ from the default scheduling offset included in the time dependent resource allocation table. In such case, the network entity would adjust its communication scheduling, whether by adjusting the downlink scheduling offset to transmit the downlink signal at a different time or by adjusting the uplink scheduling offset to expect the uplink transmission from the UE at a different time.

As described with reference to FIGS. 4A and 4B, the present disclosure provides techniques for beam-dependent scheduling offset determination and configuration by allowing a UE performing adaptive beamforming to provide input to a network entity for determining minimum, beam-dependent scheduling offsets. In some aspects, the present disclosure provides techniques for beam-dependent scheduling offset determination and configuration by allowing a UE performing adaptive beamforming to provide input to a network entity for determining minimum, beam-dependent scheduling offsets. Enabling use of adaptive beamforming allows for communications dynamically using beams outside of the fixed/finite number of beams stored in current codebook-based beamforming approach. A codebook-based beamforming approach typically corresponds to the use of a fixed/finite number of beam weights stored in a UE's radio frequency integrated circuit (RFIC) chip memory. Therefore, adaptive beamforming corresponds to beamforming in an "unconstrained" sense, wherein the beam weights are not a priori stored anywhere in the RFIC chip. These beam weights are determined dynamically according to channel conditions or in mission-mode operations. As a result, the determination/synthesis period for these adaptive beam weights could be non-constant/beam-dependent. The beam-dependent scheduling offset further improves the efficiency and reliability of the communications using the non-codebook-based beams by allowing distinct scheduling offsets for the determined adaptive beam weights. Because adaptive beamforming results in using non-codebook-based beams, common uplink/downlink scheduling offsets would be difficult to maintain for such beams.

Figure 5A:
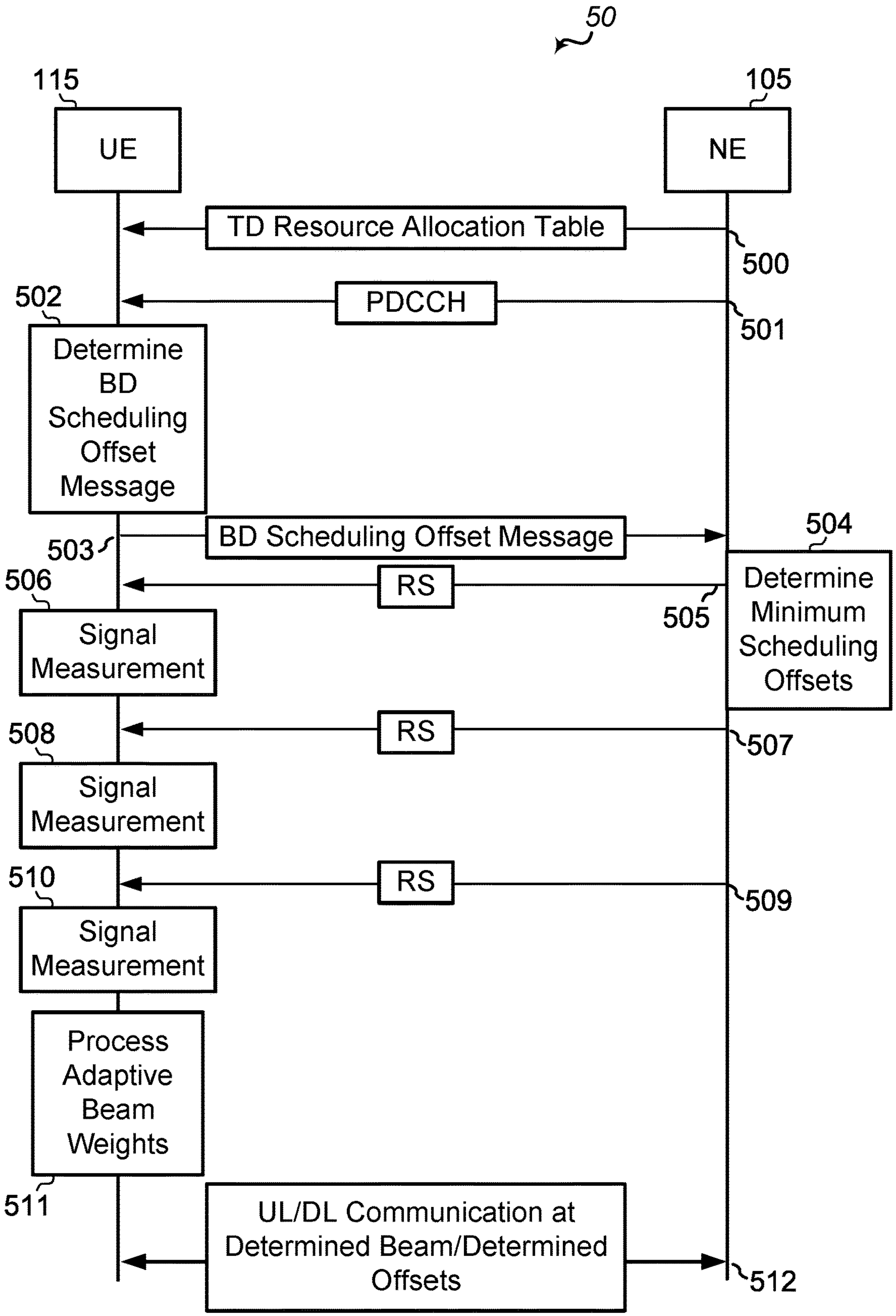
FIGS. 5A-5C are call flow diagrams illustrating communications between a UE and network entity within a wireless network, where the UE and network entity configured to support beam-dependent scheduling offset determination and configuration according to one or more aspects.

FIG. 5A is a call flow diagram illustrating communications 50 between a UE 115 and network entity 105 within a wireless network, UE 115 and network entity 105 configured to support beam-dependent scheduling offset determination and configuration according to one or more aspects. At 500, network entity 105 transmits a time domain resource allocation table to UE 115. As noted above, a time domain resource allocation table stored at UE 115 may include up to 16 rows of information, which includes scheduling parameters such as a mapping type, uplink and downlink scheduling offsets, starting symbol index, number of symbols, and the like. At 501, network entity 105 transmits a PDCCH to UE 115 that includes a scheduling message, whether it's a downlink scheduling message or an uplink resource allocation. Upon receiving the PDCCH at 501, UE 115 begins an adaptive beamforming procedure in order to learn adaptive beam weights over a beam synthesis period where UE 115 measures multiple reference signals from network entity 105 and processes the measurements to determine the adaptive beam weights.

In response to the PDCCH at 501, UE 115 also determines a beam-dependent scheduling offset message that is based on the processing state of UE 115 in the adaptive beamforming procedure. In a first example aspect, the beam-dependent scheduling offset message may include a beam-dependent minimum scheduling offset which sets out an explicit minimum scheduling offset for network entity 105 to use with regard to UE 115. In a second example aspect, the beam-dependent scheduling offset message may include an indication of the processing state that UE 115 is in for the adaptive beamforming procedure. Network entity 105 would use the processing state to determine the minimum scheduling offset based on its understanding of how far along in the adaptive beamforming procedure UE 115 is.

As illustrated, the PDCCH at 501 is the first time that UE 115 has received such a scheduling grant (e.g., it was included in the scheduling DCI/sidelink control information (SCI) of the PDCCH, or, alternatively, in a MAC-CE, received just prior to that). At 503, UE 115 transmits the beam-dependent scheduling offset message to network entity 105. The beam-dependent scheduling offset message indicates that UE 115 has just begun the adaptive beamforming procedure. As noted, network entity 105, at 504, uses the beam-dependent scheduling offset message to determine the minimum scheduling offsets.

The determination by network entity 105 may, in the first example aspect described above, be simply receiving the explicit minimum scheduling offset that was determined and received from UE 115. Alternatively, the determination may comprise receiving a processing state from UE 115 and determining the minimum scheduling offset based on where UE 115 is in the adaptive beamforming procedure. Over the course of 505, 507, and 509, network entity 105 transmits regular references signals (e.g., CSI-RS, synchronization signal block (SSB), etc.), which UE 115 performs signal measurements at 506, 508, and 510. Using the signal measurement information, UE 115 then, at 511, processes adaptive beam weights that define the beam for the scheduled communications. At 512, the communications between UE 115 and network entity 105 occurs, whether uplink communication from UE 115 to network entity 105 at a beam-dependent uplink scheduling offset using an uplink beam defined by the adaptive beam weights or downlink communication from network entity 105 to UE 115 at a beam-dependent downlink scheduling offset using a downlink beam defined by the adaptive beam weights. In the illustrated aspect, the beam-dependent scheduling offset reflects UE 115 completing the entire adaptive beamforming procedure from beginning to end.

Figure 5B:
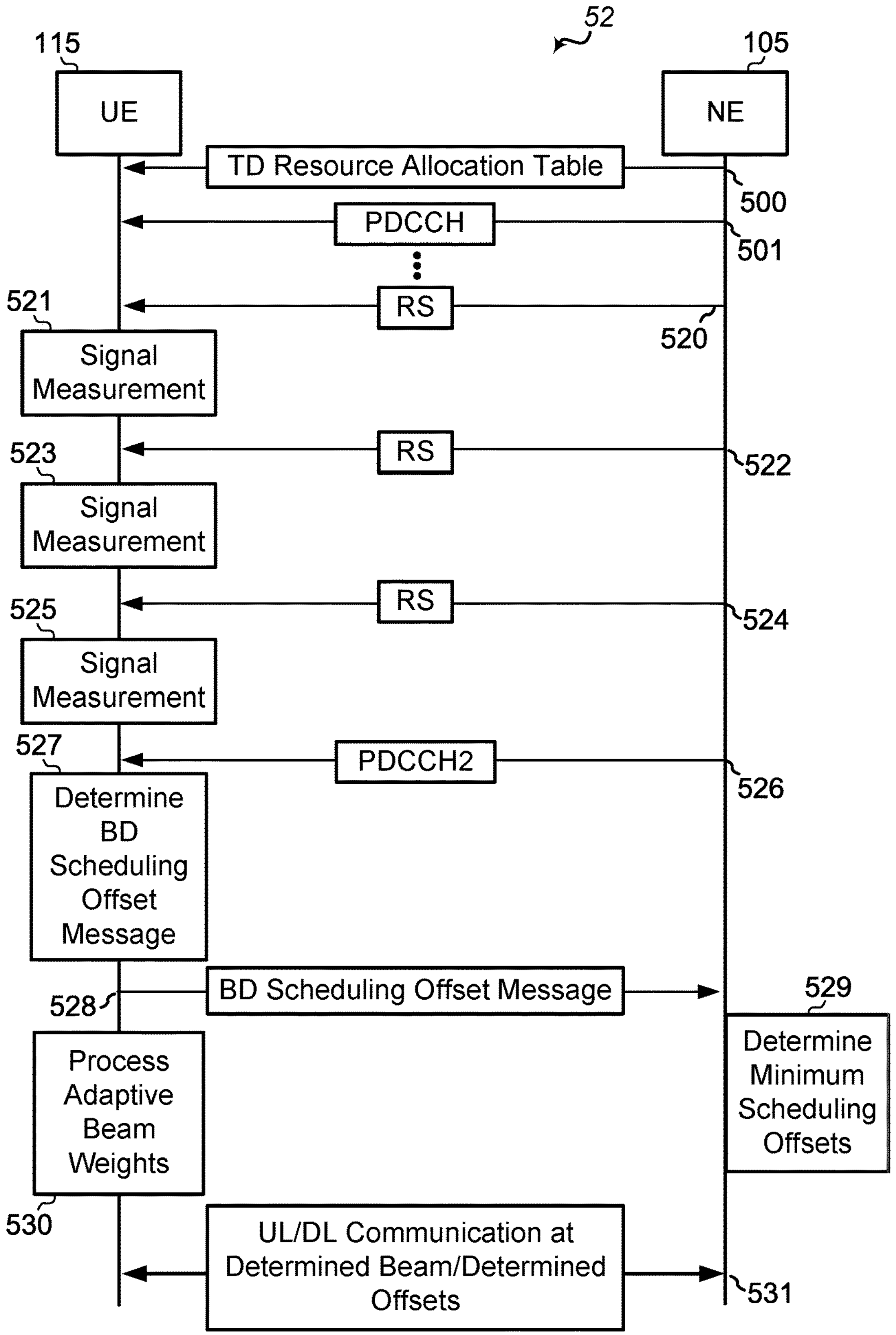

FIG. 5B is a call flow diagram illustrating communications 52 between a UE 115 and network entity 105 within a wireless network, UE 115 and network entity 105 configured to support beam-dependent scheduling offset determination and configuration according to one or more aspects. As described with respect to FIG. 5A, at 500, network entity 105 transmits a time domain resource allocation table to UE 115. At 501, network entity 105 transmits a PDCCH to UE 115 that includes a scheduling message that may cause UE 115 to begin an adaptive beamforming procedure. However, communications 52, illustrated in FIG. 5B, reflect the response of UE 115 to a second PDCCH, PDCCH2, transmitted by network entity 105 at 526.

UE 115 began the adaptive beamforming procedure by performing signal measurements at 521, 523, and 525 of reference signals transmitted by network entity 105 at 520, 522, and 524. When UE 115 receives the PDCCH2 at 526, it determines a beam-dependent scheduling offset message based on the processing state of UE 115. As illustrated in FIG. 5B, UE 115 has conducted signal measurements at 521, 523, and 525 of the reference signals transmitted by network entity 105 at 520, 522, and 524, the beam-dependent scheduling offset message would reflect a timing where UE 115 has already measured sufficient reference signals and has left to use the signal measurement information to determine the adaptive beam weights. At 528, UE 115 transmits the beam-dependent scheduling offset message to network entity 105. Network entity 105 uses the beam-dependent scheduling offset message to determine the minimum scheduling offset for use with UE 115.

In a first example aspect, as noted above, UE 115 calculates a minimum scheduling offset that reflects the processing time that will be used by UE 115 to determine the adaptive beam weights. The beam-dependent scheduling offset message in the first example aspect would include this calculated minimum scheduling offset. In a second example aspect, also as noted above, UE 115 includes its processing state in the adaptive beamforming process as the beam-dependent scheduling offset message. Network entity 105 would use this knowledge of the processing state for UE 115 in the adaptive beamforming procedure to calculate the minimum scheduling offsets for UE 115. In both example aspects according to communications 52 of FIG. 5B, because UE 115 has already begun the adaptive beamforming procedure and has already performed the number of signal measurements to synthesize the beam, the minimum scheduling offsets, whether calculated at UE 115 or network entity 105 would be less time than the offsets that would be determined according to communications 50 of FIG. 5A, as UE 115 would use a little more time to compute the adaptive beam weights.

Figure 5C:
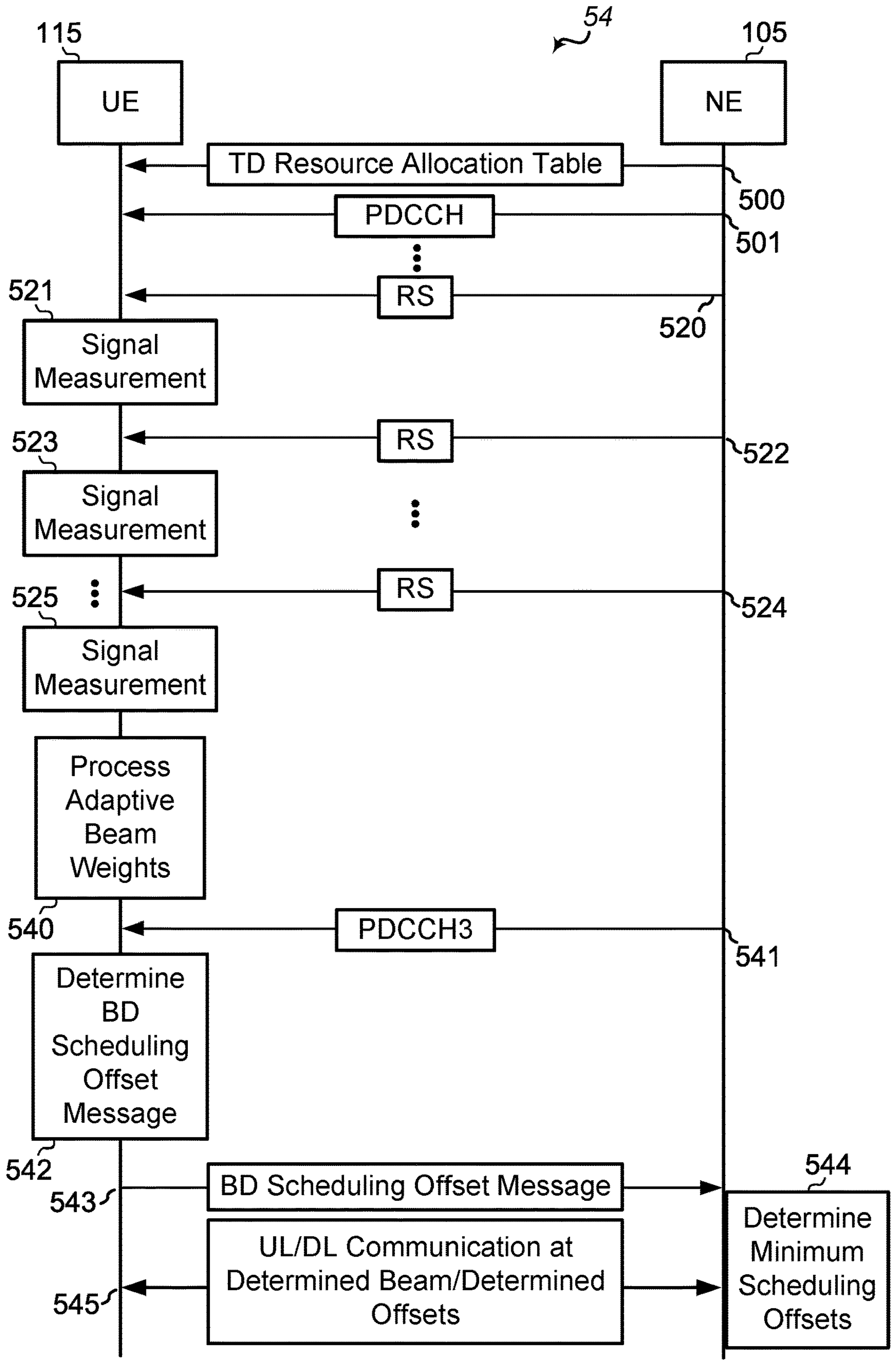

FIG. 5C is a call flow diagram illustrating communications 54 between a UE 115 and network entity 105 within a wireless network, UE 115 and network entity 105 configured to support beam-dependent scheduling offset determination and configuration according to one or more aspects. As described with respect to FIGS. 5A and 5B, at 500, network entity 105 transmits a time domain resource allocation table to UE 115, and, at 501, network entity 105 transmits a PDCCH to UE 115 that includes a scheduling message that may cause UE 115 to begin an adaptive beamforming procedure. However, communications 54, illustrated in FIG. 5C, reflect the response of UE 115 to a third PDCCH, PDCCH3, transmitted by network entity 105 at 526.

With regard to communications 54 illustrated in FIG. 5C, UE 115 has previously begun the adaptive beamforming procedure, which could have been in response to PDDCH at 501, but could also have occurred again in response to another scheduling message that occurred after the PDCCH at 501 and after the results of the previous adaptive beamforming procedure may had become stale. Within the current adaptive beamforming procedure, UE 115 has performed signal measurements, such as signal measurements 521, 523, and 525, on references signals received from network entity 105, such as reference signals transmitted at 522, 524, and 526, and has sufficiently learned information to synthesize the beam. UE 115 has further performed processed the adaptive beam weights at 540 using the learned information. UE 115 may store the determined adaptive beam weights in its fast memory. At 541, network entity 105 transmits a PDCCH3 that includes a communications grant, whether an uplink resource grant or a downlink scheduling grant.

In response to the PDCCH3, UE 115 determines a beam-dependent scheduling offset message at 542. The beam-dependent scheduling offset message is based on the processing state of UE 115 for the adaptive beamforming procedure. Because UE 115 has completed the adaptive beamforming procedure and has processed the adaptive beam weights, the beam-dependent scheduling offset message would reflect a minimum scheduling offset that may be very close in time to the codebook-based scheduling offsets, $K_0$ and $K_2$, received in the time domain resource allocation table at 500. UE 115 may then transmit the beam-dependent scheduling offset message to network entity 105 at 543, after which network entity would determine the minimum scheduling offsets at 544.

As noted above with respect to a first example aspect, UE 115 may use its processing state to calculate an explicit minimum scheduling offset and use the calculated explicit minimum scheduling offset for the beam-dependent scheduling offset message for network entity 105. In such example aspect, network entity 105, when it determines the minimum scheduling offsets at 544, would use the explicit minimum scheduling offset received from UE 115 in the beam-dependent scheduling offset message.

As noted above with respect to a second example aspect, UE 115 may send an indication of its processing state for the beam-dependent scheduling offset message for network entity 105. In such example aspect, network entity 105, when it determines the minimum scheduling offsets at 544, would use the knowledge of UE 115's processing state in the adaptive beamforming procedure to calculate the minimum scheduling offset to apply with UE 115.

With respect to FIGS. 5A and 5B, three instances of reference signals from network entity 105, which are then measured by UE 115, are shown to complete the channel measurements portion of the beam synthesis period of the adaptive beamforming procedure. It should be noted that the number of references signals that would be used by a UE, such as UE 115, to complete the channel measurements portion of the beam synthesis period is not limited to three reference signal instances, whether fewer may be used or more than three. FIG. 5C has been illustrated to suggest that more than three reference signals may be sent by network entity 105 and measured by UE 115 in order to complete the channel measurement portion of the beam synthesis period of the adaptive beamforming procedure.

The complexity of the overhead to complete the channel measurement portion or even the full adaptive beamforming procedure may depend on or be a function of multiple factors, such as the number of antenna elements, carrier frequency, array dimension (e.g., linear, planar, or more complex), channel quality, whether side-lobe suppression is used, and the UE's capabilities for processing, etc. In the first example aspect, where UE 115 computes the explicit minimum scheduling offsets, UE 115 would take these factors into consideration when computing the offsets. Similarly, in the second example aspect, network entity 105 would take these factors into consideration when computing the offsets.

It should be noted in the examples illustrated in FIGS. 5A-5C that, with regard to the second example aspect, in which UE 115 sends an implicit inference of the minimum scheduling offset by sending an indication of its processing state, network entity 105 may treat the computed beam-dependent minimum scheduling offsets either as a "one-shot" modification for the next scheduled communication (e.g., PDSCH, PUSCH, etc.) or as a common or unified modification for all following scheduled communications until further updated. Network entity 105 may determine how to treat the computed beam-dependent minimum scheduling offsets based on UE 115's beam indication.

Figure 6:
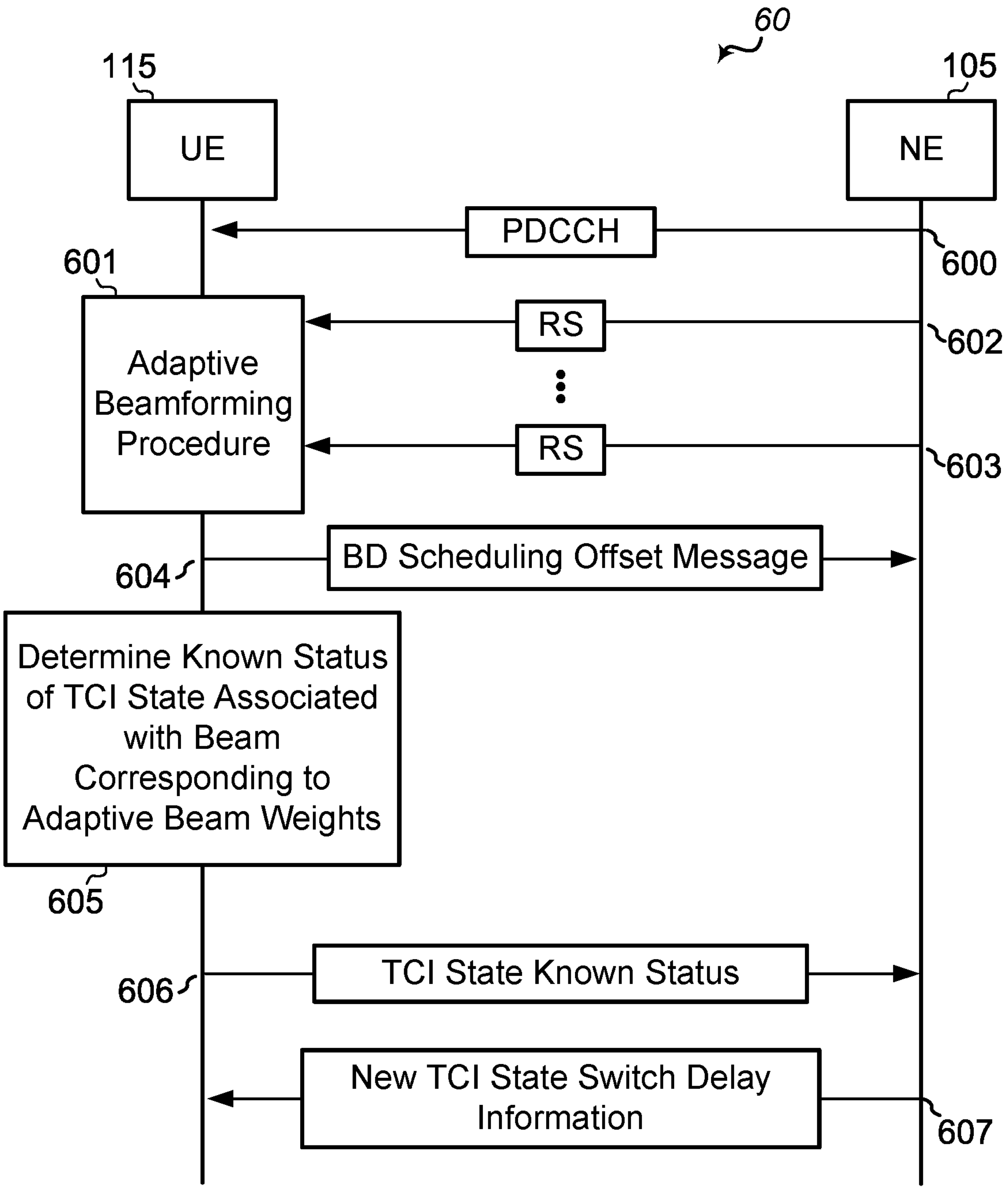
FIG. 6 is a call flow diagram illustrating communications between a UE and network entity within a wireless network, wherein the UE and network entity configured to support beam-dependent scheduling offset determination and configuration according to one or more aspects.

FIG. 6 is a call flow diagram illustrating communications 60 between a UE 115 and network entity 105 within a wireless network, UE 115 and network entity 105 configured to support beam-dependent scheduling offset determination and configuration according to one or more aspects. In operation of the adaptive beamforming procedure, a UE, such as UE 115, performs signal measurements on a number of reference signals transmitted by network entity 105 and uses the measurement information to determine adaptive beam weights. The adaptive beam weights correspond to the measurement information of the reference signals and not necessarily to any beams or beamforming information that UE 115 has previously been configured with. Accordingly, a beam associated with the adaptive beam weights determined in the adaptive beamforming procedure may correspond to a TCI state that is unknown to UE 115 or that UE 115 has not previously been configured with and used in communications with network entity 105. If the TCI state is unknown to UE 115, the TCI state switch delay may not be known to UE 115 or network entity 105. In such case, if UE 115 were to proceed with communications using the beam associated with the adaptive beam weights and the unknown TCI state, network entity 105 may not use the correct TCI switch delay for determining the ultimate scheduling offset to either conduct a downlink transmission or expect an uplink transmission from UE 115.

Aspects of the present disclosure may provide for UE 115 to transmit an indication to network entity 105 indicating whether the TCI state corresponding to the beam associated with the determined adaptive beam weights is known or unknown to UE 115. With respect to communications 60, network entity 105 transmits a PDCCH at 600 to UE 115. The PDCCH triggers UE 115 to conduct the adaptive beamforming procedure at 601, including receiving and conducting measurements on reference signal transmitted by network entity 105, including at 602 and 603, and using the measurement information to determine the adaptive beam weights for UE 115's scheduled communications. At 604, UE 115 may transmit a beam-dependent scheduling offset message, which may comprise an explicit minimum scheduling offset calculated by UE 115 or an implicit indication representative of UE 115's processing state within the adaptive beamforming procedure.

As UE 115 determines the adaptive beam weights, UE 115 may determine the beam associated with the adaptive beam weights and the TCI state corresponding to the beam and further determine whether the corresponding TCI state is known or unknown to UE 115. Once the known state is determined, UE 115 may transmit the TCI state known status to network entity 105 at 606. In response to the TCI state known status indicating a known TCI state at UE 115, network entity 105 may determine the active TCI state switch delay according to current standards, based on whether the TCI state switch is performed via MAC-CE, DCI, or RRC. In response to the TCI state known status indicating an unknown TCI state at UE 115, network entity 105 may generate new TCI state switch delay parameters or equations for UE 115 and send such new TCI state switch delay information to UE 115 at 607.

Under current standards, the TCI state is known at a UE, such as UE 115, if, during the period from the last transmission of the reference signal resource used for a layer 1 reference signal receive power (L1-RSRP) measurement reporting for the target TCI state to the completion of active TCI state switch, where the reference signal resource for the L1-RSRP measurement is the reference signal in the target TCI state or that is QCL'ed to the target TCI state, the TCI state switch command is received within 1280 ms upon the last transmission of the reference signal resource for beam reporting or measurement, the UE has sent at least one L1-RSRP report for the target TCI state before the TCI state switch command, the TCI state remains detectable during the TCI state switching period, the SSB associated with the TCI state remains detectable during the TCI switching period, or the signal-to-noise ratio (SNR) of the TCI state is greater than the half-power point (e.g, ≥−3 dB). Otherwise, the TCI state is unknown at the UE.

In an alternative aspect illustrated in FIG. 6, the generation of new TCI state switch delay parameters or equations by network entity 105 may depend on or be in response to UE 115 using adaptive beam weights derived from the adaptive beamforming procedure. Network entity 105 would obtain this knowledge upon receipt of the beam-dependent scheduling offset message at 604. With this information, after receiving the TCI state known status at 606, network entity 105 would generate new TCI state switch delay parameters or equations for UE 115 and send such new TCI state switch delay information to UE 115 at 607. While not illustrated in FIG. 6, if UE 115 did not perform the adaptive beamforming procedure and used codebook-based beam weights, network entity 105 would not generate new TCI state switch delay information and would instead use existing TCI state switch delay information, which, as noted, are based on whether the TCI state switch is performed via MAC-CE, DCI, or RRC.

Figure 7:
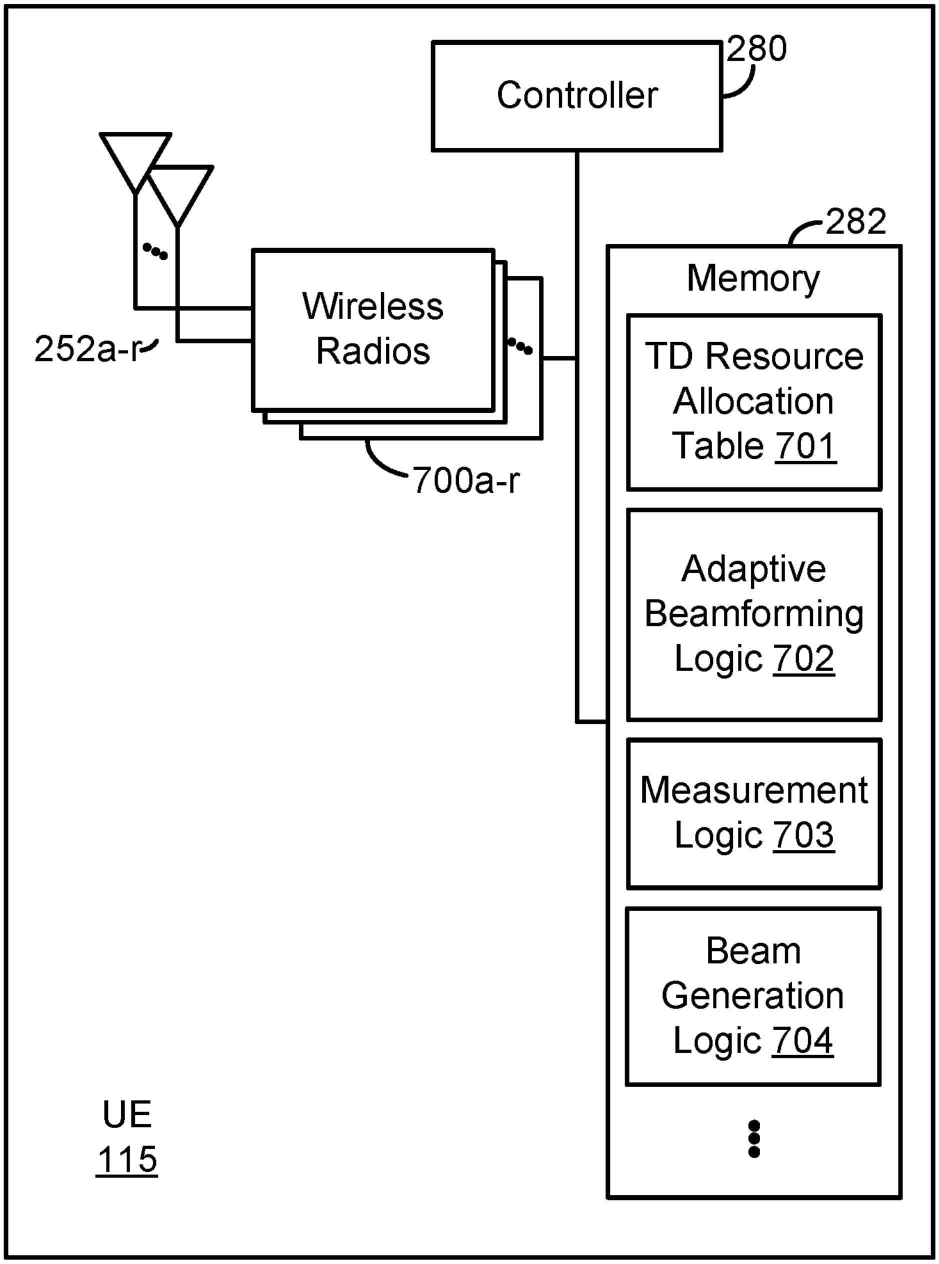
FIG. 7 is a block diagram of an example UE that supports beam-dependent scheduling offset determination and configuration according to one or more aspects.

FIG. 7 is a block diagram of an example UE 115 that supports beam-dependent scheduling offset determination and configuration according to one or more aspects. UE 115 may be configured to perform operations, including the blocks of a process described with reference to FIG. 4A. In some implementations, UE 115 includes the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 701$a$-$r$ and antennas 252$a$-$r$. Wireless radios 701$a$-$r$ include various components and hardware, as illustrated in FIG. 2 for UE 115, including modulator and demodulators 254$a$-$r$, MIMO detector 256, receive processor 258, transmit processor 264, and TX MIMO processor 266.

Figure 8:
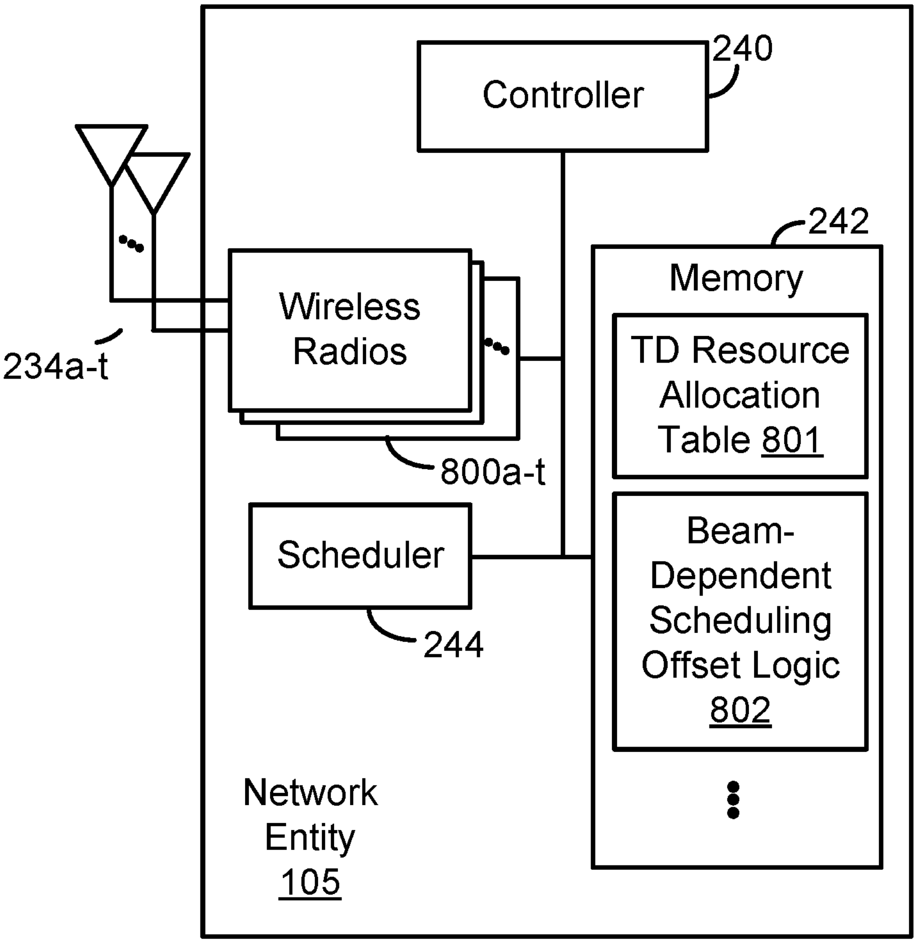
FIG. 8 is a block diagram of an example base station that supports beam-dependent scheduling offset determination and configuration according to one or more aspects.

As shown, memory 282 may include time domain (TD) resource allocation table 701, adaptive beamforming logic 702, measurement logic 703, and beam generation logic 704. TD resource allocation table 701 corresponds to the TD resource allocation table received from a network entity that includes rows of candidate scheduling parameters for UE 115 communication within the communication environment served by the network entity and associated with the fixed/finite number of communication beams defined for codebook-based communications. Adaptive beamforming logic 702 may correspond to the instructions and code, which, when executed by controller 280 (referred to herein as the "execution environment" of adaptive beamforming logic 702), implements and enables UE 115 with the functionality of adaptive beamforming. Measurement logic 703 may correspond to the instructions and code, which, when executed by controller 280, implements and enables UE 115 with functionality to perform various measurements. For example, within the execution environment of measurement logic 703, UE 115 may perform measurements of received signals, reference signals, and the like, to determine channel conditions for operations, such as channel state indication (CSI) and the like, in addition to supporting the adaptive beamforming procedure through learning sufficient information from measurements of successive reference signals for determining the adaptive beam weights. Beam generation logic 704 may correspond to the instruction and code, which, when executed by controller 280, implements and enables the beamforming/beam generation functionality at UE 115. UE 115 may, via wireless radios 700$a$-$r$ and antennas 252$a$-$r$, receive signals from or transmit signals to one or more network entities, such as network entity 105 or base station 140 of FIGS. 1-6 or a network entity 105 as illustrated in FIG. 8.

UE 115 may receive a time division resource allocation table from a network entity (NOT SHOWN), via antennas 252$a$-$r$ and wireless radios 700$a$-$r$. UE 115 may then store the resource allocation table in memory 282 at TD resource allocation table 701. The stored resource allocation table provides rows of candidate scheduling parameters for UE 115 to use within the communication environment of the network entity.

In response to receiving a scheduling message from the network entity, UE 115, under control of controller 280, executes adaptive beamforming logic 702. The execution environment of adaptive beamforming logic 702 initiates the adaptive beamforming procedure at UE 115 and prompts execution, under control of controller 280, of measurement logic 703. Within the execution environments of adaptive beamforming logic 702 and measurement logic 703, UE 115 takes measurements of successive reference signals from the network entity (e.g., CSI-RS, SSB, etc.). Once the sufficient amount of information on the current channel conditions is obtained through the measurement, UE 115, within the execution environment of adaptive beamforming logic 702 may determine adaptive beam weights for a communication beam.

The code and instructions within adaptive beamforming logic 702 includes code and instructions that implement the various aspects of the present disclosure. Thus, within the execution environment of adaptive beamforming logic 702, upon receiving a scheduling message from the network entity, UE 115 may determine what processing state it is in within the adaptive beamforming process. If the scheduling message is a first scheduling message received by UE 115 within a particular communication environment or the first scheduling message it has received after a considerable period of time, UE 115 may have just initiated the adaptive beamforming procedure and would have the entire procedure to get through before determining the adaptive beam weights. Similarly, if the scheduling message has been received after other scheduling messages, such that UE 115 has completed the adaptive beamforming procedure and has already determined the adaptive beam weights. Further, if the scheduling message has been received after other scheduling messages, but before completion of the adaptive beamforming procedure, UE 115 would have the time left to complete the adaptive beamforming procedure to determine the adaptive beam weights. Therefore, when UE 115 receives a scheduling message from the network entity, whether scheduling a downlink transmission or allocating resources for an uplink transmission, UE 115, within the execution environment of adaptive beamforming logic 702, identifies its processing state and transmits a beam-dependent scheduling offset message to the network entity that is based on that processing state.

The beam-dependent scheduling offset message may represent a specific, minimum scheduling offset as calculated by UE 115. In such aspect, UE 115 identifies its processing state and then calculates the minimum scheduling offset that would allow UE 115 to complete the adaptive beamforming procedure. With respect to the three states discussed above, the minimum scheduling offset may be the longest when UE 115 has just initiated the adaptive beamforming procedure, may be the shortest, including very close to the default scheduling offsets, $K_0$ and $K_2$, in the time domain resource allocation table, and may be somewhere in between when the current processing state is somewhere between initiation and completion.

Once UE 115 completes the adaptive beamforming procedure and determines the adaptive beam weights, UE 115, under control of controller 280, executes beam generation logic 704, stored in memory 282. The execution environment of beam generation logic 704 enables UE 115 to use the adaptive beam weights to generate the beam to conduct the communication. UE 115 may the conduct the scheduled communication, whether it is receiving a downlink transmission from the network entity or transmit an uplink transmission to the network entity, using the generated beam.

FIG. 8 is a block diagram of an example network entity 105 that supports beam-dependent scheduling offset determination and configuration according to one or more aspects. Network entity 105 may be configured to perform operations, including the blocks of process 41 described with reference to FIG. 4B. In some implementations, network entity 105 includes the structure, hardware, and components shown and described with reference to base station 105 of FIGS. 1-2. For example, network entity 105 may include controller 240, which operates to execute logic or computer instructions stored in memory 242, as well as controlling the components of network entity 105 that provide the features and functionality of network entity 105, and scheduler 244, which operates under control of controller 240, for scheduling communications of network entity 105 and also for any served UEs. Network entity 105, under control of controller 240, transmits and receives signals via wireless radios 801*a*-*t* and antennas 234*a*-*t*. Wireless radios 801*a*-*t* include various components and hardware, as illustrated in FIG. 2 for base station 140, including modulator and demodulators 232*a*-*t*, transmit processor 220, TX MIMO processor 230, MIMO detector 236, and receive processor 238.

As shown, the memory 242 may include TD resource allocation table 801 and beam-dependent scheduling offset logic 802. TD resource allocation table 801 corresponds to the TD resource allocation table received that network entity 105 transmits to served UEs. The resource allocation table includes rows of candidate scheduling parameters for UEs' communication within the communication environment served by network entity 105 and associated with the fixed/finite number of communication beams defined for codebook-based communications. Beam-dependent scheduling offset logic 802 includes the code and instructions, which, when executed by controller 240, implements and enables network entity 105 with the functionality to support beam-dependent scheduling offset determination and configuration according to one or more aspects. Network entity 105 may receive signals from or transmit signals to one or more UEs, such as UE 115 of FIGS. 1-6 or UE 115 of FIG. 7.

Network entity 105, under control of controller 240, may compile the resource allocation table for served UEs based on known channel conditions and the fixed/finite number of communication beams defined for codebook-based communications. Network entity 105 stores this resource allocation table in memory 242 at TD resource allocation table 801. Network entity 105 may transmit the resource allocation table from TD resource allocation table 801 to served UEs via wireless radios 800*a*-*t* and antennas 234*a*-*t*.

In serving UEs within its coverage area, network entity 105, under control of controller 240 and scheduler 244 may schedule uplink and downlink communication between itself and the served UEs. Network entity 105 may then transmit a scheduling message, which may schedule a downlink transmission or grant resources for an uplink transmission, to the served UEs. The scheduling message may include a row indicator that informs the UE which row of the TD resource allocation table to use to identify the scheduling parameters for the scheduled communication.

In operation of the one or more aspects of the present disclosure, network entity 105 may receive a beam-dependent scheduling offset message from a served UE via antennas 234*a*-*t* and wireless radios 800*a*-*t*. Network entity 105, under control of controller 240, may execute beam-dependent scheduling offset logic 802. The execution environment of beam-dependent scheduling offset logic 802 implements and enables network entity 105 with the functionality to support beam-dependent scheduling offset determination and configuration according to one or more aspects. Network entity 105 may then use the beam-dependent scheduling offset message to identify a new, beam-dependent scheduling offset for the scheduled communications. As noted above, the beam-dependent scheduling offset message may include a specific, beam-dependent minimum scheduling offset calculated by the served UE. Network entity 105 would use this beam-dependent minimum scheduling offset as the new scheduling offset. In other aspects, the beam-dependent scheduling offset message may include an indicator of the served UE's processing state in the adaptive beamforming procedure. In such aspects, network entity 105 may calculate the new, beam-dependent minimum scheduling offset based on the amount of time it would estimate the served UE to complete the adaptive beamforming procedures from the reported processing state. Once the new, beam-dependent minimum scheduling offset is determined or identified, network entity may engage in the scheduled communications with the served UE at that offset.

It is noted that one or more blocks (or operations) described with reference to FIGS. 4A and 4B may be combined with one or more blocks (or operations) described with reference to another of the figures. For example, one or more blocks (or operations) of FIG. 4A may be combined with one or more blocks (or operations) of FIG. 5A. As another example, one or more blocks associated with FIG. 4B may be combined with one or more blocks associated with FIG. 6. As another example, one or more blocks associated with FIGS. 4A and 4B may be combined with one or more blocks (or operations) associated with FIGS. 1-2. Additionally, or alternatively, one or more operations described above with reference to FIGS. 1-2 may be combined with one or more operations described with reference to FIG. 7 or 8.

In one or more aspects, techniques for supporting beam-dependent scheduling offset determination and configuration may include additional aspects, such as any single aspect or any combination of aspects described below or in connection with one or more other processes or devices described elsewhere herein. In a first aspect, beam-dependent scheduling offset determination and configuration may include an apparatus configured to receive a time domain resource allocation table including one or more default scheduling offsets for one of uplink communication or downlink communication, to receive a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table, and to transmit a beam-dependent scheduling offset message to the network entity, the beam-dependent scheduling offset message being based on a processing state of the UE in an adaptive beamforming procedure. The UE may further be configured to then generate a beam for one of the uplink communication or the downlink communication using one or more adaptive beam weights determined in the adaptive beamforming procedure and then perform the one of the uplink communication or the downlink communication using the beam at a beam-dependent scheduling offset, the beam-dependent scheduling offset corresponding to a time for the UE to complete the adaptive beamforming procedure from the processing state.

Additionally, an apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, wherein the beam-dependent scheduling offset message includes a minimum beam-dependent scheduling offset, the minimum beam-dependent scheduling offset is a minimum time calculated by the UE to complete the adaptive beamforming procedure from the processing state.

In a third aspect, alone or in combination with one or more of the first aspect and the second aspect, wherein the beam-dependent scheduling offset message includes an indicator of the processing state of the UE in the adaptive beamforming procedure.

In a fourth aspect, alone or in combination with one or more of the first aspect through the third aspect, wherein the processor-readable code further causes the at least one processor to: identify a TCI state associated with the one or more adaptive beam weights; determine a known status of the TCI state by the UE, the known status being one of the TCI state is known to the UE or the TCI state is unknown to the UE; and transmit the known status of the TCI state to the network entity.

In a fifth aspect, alone or in combination with one or more of the first aspect through the fourth aspect, wherein the processor-readable code further causes the at least one processor to: receive from the network entity a new TCI state switch delay configuration associated with the adaptive beamforming procedure.

A sixth aspect may include a method of wireless communication performed by a UE, including: receiving a time domain resource allocation table including one or more default scheduling offsets for one of uplink communication or downlink communication; receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table; transmitting a beam-dependent scheduling offset message to the network entity, the beam-dependent scheduling offset message being based on a processing state of the UE in an adaptive beamforming procedure; generating a beam for one of the uplink communication or the downlink communication using one or more adaptive beam weights determined in the adaptive beamforming procedure; and performing the one of the uplink communication or the downlink communication using the beam at a beam-dependent scheduling offset, the beam-dependent scheduling offset corresponding to a time for the UE to complete the adaptive beamforming procedure from the processing state.

In a seventh aspect, alone or in combination with the sixth aspect, wherein the beam-dependent scheduling offset message includes a minimum beam-dependent scheduling offset, the minimum beam-dependent scheduling offset is a minimum time calculated by the UE to complete the adaptive beamforming procedure from the processing state.

In an eighth aspect, alone or in combination with one or more of the sixth aspect and the seventh aspect, wherein the beam-dependent scheduling offset message includes an indicator of the processing state of the UE in the adaptive beamforming procedure.

In a ninth aspect, alone or in combination with one or more of the sixth aspect through the eighth aspect, further including: identifying a TCI state associated with the one or more adaptive beam weights; determining a known status of the TCI state by the UE, the known status being one of the TCI state is known to the UE or the TCI state is unknown to the UE; and transmitting the known status of the TCI state to the network entity.

In a tenth aspect, alone or in combination with one or more of the sixth aspect through the ninth aspect, further including: receiving from the network entity a new TCI state switch delay configuration associated with the adaptive beamforming procedure.

An eleventh aspect may include a UE configured for wireless communication that includes: means for receiving a time domain resource allocation table including one or more default scheduling offsets for one of uplink communication or downlink communication; means for receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table; means for transmitting a beam-dependent scheduling offset message to the network entity, the beam-dependent scheduling offset message being based on a processing state of the UE in an adaptive beamforming procedure; means for generating a beam for one of the uplink communication or the downlink communication using one or more adaptive beam weights determined in the adaptive beamforming procedure; and means for performing the one of the uplink communication or the downlink communication using the beam at a beam-dependent scheduling offset, the beam-dependent scheduling offset corresponding to a time for the UE to complete the adaptive beamforming procedure from the processing state.

In a twelfth aspect, alone or in combination with the eleventh aspect, wherein the beam-dependent scheduling offset message includes a minimum beam-dependent scheduling offset, the minimum beam-dependent scheduling offset is a minimum time calculated by the UE to complete the adaptive beamforming procedure from the processing state.

In a thirteenth aspect, alone or in combination with one or more of the eleventh aspect and the twelfth aspect, wherein the beam-dependent scheduling offset message includes an indicator of the processing state of the UE in the adaptive beamforming procedure.

In a fourteenth aspect, alone or in combination with one or more of the eleventh aspect through the thirteenth aspect, further including: means for identifying a TCI state associated with the one or more adaptive beam weights; means for determining a known status of the TCI state by the UE, the known status being one of the TCI state is known to the UE or the TCI state is unknown to the UE; and means for transmitting the known status of the TCI state to the network entity.

In a fifteenth aspect, alone or in combination with one or more of the eleventh aspect through the fourteenth aspect, further including: means for receiving from the network entity a new TCI state switch delay configuration associated with the adaptive beamforming procedure.

A sixteenth aspect may include a non-transitory computer-readable medium storing instructions. When executed by a processor of a UE, the instructions cause the processor to perform operations comprising: receiving a time domain resource allocation table including one or more default scheduling offsets for one of uplink communication or downlink communication; receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table; transmitting a beam-dependent scheduling offset message to the network entity, the beam-dependent scheduling offset message being based on a processing state of the UE in an adaptive beamforming procedure; generating a beam for one of the uplink communication or the downlink communication using one or more adaptive beam weights determined in the adaptive beamforming procedure; and performing the one of the uplink communication or the downlink communication using the beam at a beam-dependent scheduling offset, the beam-dependent scheduling offset corresponding to a time for the UE to complete the adaptive beamforming procedure from the processing state.

In a seventeenth aspect, alone or in combination with the sixteenth aspect, wherein the beam-dependent scheduling offset message includes a minimum beam-dependent scheduling offset, the minimum beam-dependent scheduling offset is a minimum time calculated by the UE to complete the adaptive beamforming procedure from the processing state.

In an eighteenth aspect, alone or in combination with one or more of the sixteenth aspect and the seventeenth aspect, wherein the beam-dependent scheduling offset message includes an indicator of the processing state of the UE in the adaptive beamforming procedure.

In a nineteenth aspect, alone or in combination with one or more of the sixteenth aspect through the eighteenth aspect, wherein the instructions further cause the processor to perform operations including: identifying a TCI state associated with the one or more adaptive beam weights; determining a known status of the TCI state by the UE, the known status being one of the TCI state is known to the UE or the TCI state is unknown to the UE; and transmitting the known status of the TCI state to the network entity.

In a twentieth aspect, alone or in combination with one or more of the sixteenth aspect through the nineteenth aspect, wherein the instructions further cause the processor to perform operations including: receiving from the network entity a new TCI state switch delay configuration associated with the adaptive beamforming procedure.

In one or more aspects, techniques for supporting beam-dependent scheduling offset determination and configuration may include additional aspects, such as any single aspect or any combination of aspects described below or in connection with one or more other processes or devices described elsewhere herein. A twenty-first aspect, supporting beam-dependent scheduling offset determination and configuration may include a network entity configured to transmit to at least one UE a time domain resource allocation table including one or more default scheduling offsets for one of uplink communication or downlink communication; transmit a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table. The network entity is configured further to receive a beam-dependent scheduling offset message from the at least one UE and determine a beam-dependent scheduling offset based on the beam-dependent scheduling offset message. The network entity may then perform one of the uplink communication or the downlink communication using the beam-dependent scheduling offset.

Additionally, the apparatus may perform or operate according to one or more aspects as described below. In some implementations, the apparatus includes a wireless device, such as a network entity or base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-second aspect, alone or in combination with the twenty-first aspect, wherein the beam-dependent scheduling offset message is the beam-dependent scheduling offset.

In a twenty-third aspect, alone or in combination with one or more of the twenty-first aspect and the twenty-second aspect, wherein the beam-dependent scheduling offset message includes an indicator of a processing state of the at least one UE in an adaptive beamforming procedure.

In a twenty-fourth aspect, alone or in combination with one or more of the twenty-first aspect through the twenty-third aspect, wherein the processor-readable code further causes the at least one processor to: receive, from the at least one UE, a known status of a TCI state corresponding to adaptive beam weights generated by the at least one UE, the known status being one of the TCI state is known to the at least one UE or the TCI state is unknown to the at least one UE.

In a twenty-fifth aspect, alone or in combination with one or more of the twenty-first aspect through the twenty-fourth aspect, wherein the processor-readable code further causes the at least one processor to: generate a new TCI state switch delay configuration for the at least one UE, the new TCI state switch delay configuration generated in response to receipt of the beam-dependent scheduling offset message and the known status; and transmit the new TCI state switch delay configuration to the at least one UE.

A twenty-sixth aspect may include a method of wireless communication performed by a network entity that includes: transmitting to at least one UE a time domain resource allocation table including one or more default scheduling offsets for one of uplink communication or downlink communication; transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table; receiving a beam-dependent scheduling offset message from the at least one UE; determining a beam-dependent scheduling offset based on the beam-dependent scheduling offset message; and performing one of the uplink communication or the downlink communication using the beam-dependent scheduling offset.

In a twenty-seventh aspect, alone or in combination with the twenty-sixth aspect, wherein the beam-dependent scheduling offset message is the beam-dependent scheduling offset.

In a twenty-eighth aspect, alone or in combination with one or more of the twenty-sixth aspect and the twenty-seventh aspect, wherein the beam-dependent scheduling offset message includes an indicator of a processing state of the at least one UE in an adaptive beamforming procedure.

In a twenty-ninth aspect, alone or in combination with one or more of the twenty-sixth aspect through the twenty-eighth aspect, further including: receiving, from the at least one UE, a known status of a TCI state corresponding to adaptive beam weights generated by the at least one UE, the known status being one of the TCI state is known to the at least one UE or the TCI state is unknown to the at least one UE.

In a thirtieth aspect, alone or in combination with one or more of the twenty-sixth aspect through the twenty-ninth aspect, further including: generating a new TCI state switch delay configuration for the at least one UE, the new TCI state switch delay configuration generated in response to receipt of the beam-dependent scheduling offset message and the known status; and transmitting the new TCI state switch delay configuration to the at least one UE.

A thirty-first aspect may include a network entity configured for wireless communication that includes: means for transmitting to at least one UE a time domain resource allocation table including one or more default scheduling offsets for one of uplink communication or downlink communication; means for transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table; means for receiving a beam-dependent scheduling offset message from the at least one UE; means for determining a beam-dependent scheduling offset based on the beam-dependent scheduling offset message; and means for performing one of the uplink communication or the downlink communication using the beam-dependent scheduling offset.

In a thirty-second aspect, alone or in combination with the thirty-first aspect, wherein the beam-dependent scheduling offset message is the beam-dependent scheduling offset.

In a thirty-third aspect, alone or in combination with one or more of the thirty-first aspect and the thirty-second aspect, wherein the beam-dependent scheduling offset message includes an indicator of a processing state of the at least one UE in an adaptive beamforming procedure.

In a thirty-fourth aspect, alone or in combination with one or more of the thirty-first aspect through the thirty-third aspect, further including: means for receiving, from the at least one UE, a known status of a TCI state corresponding to adaptive beam weights generated by the at least one UE, the known status being one of the TCI state is known to the at least one UE or the TCI state is unknown to the at least one UE.

In a thirty-fifth aspect, alone or in combination with one or more of the thirty-first aspect through the thirty-fourth aspect, further including: means for generating a new TCI state switch delay configuration for the at least one UE, the new TCI state switch delay configuration generated in response to receipt of the beam-dependent scheduling offset message and the known status; and means for transmitting the new TCI state switch delay configuration to the at least one UE.

A thirty-sixth aspect may include a non-transitory computer-readable medium storing instructions. When executed by a processor of a network entity, the instructions cause the processor to perform operations comprising: transmitting to at least one UE a time domain resource allocation table including one or more default scheduling offsets for one of uplink communication or downlink communication; transmitting a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table; receiving a beam-dependent scheduling offset message from the at least one UE; determining a beam-dependent scheduling offset based on the beam-dependent scheduling offset message; and performing one of the uplink communication or the downlink communication using the beam-dependent scheduling offset.

In a thirty-seventh aspect, alone or in combination with the thirty-sixth aspect, wherein the beam-dependent scheduling offset message is the beam-dependent scheduling offset.

In a thirty-eighth aspect, alone or in combination with one or more of the thirty-sixth aspect and the thirty-seventh aspect, wherein the beam-dependent scheduling offset message includes an indicator of a processing state of the at least one UE in an adaptive beamforming procedure.

In a thirty-ninth aspect, alone or in combination with one or more of the thirty-sixty aspect through the thirty-eighth aspect, wherein the instructions further cause the processor to perform operations including: receiving, from the at least one UE, a known status of a TCI state corresponding to adaptive beam weights generated by the at least one UE, the known status being one of the TCI state is known to the at least one UE or the TCI state is unknown to the at least one UE.

In a fortieth aspect, alone or in combination with one or more of the thirty-sixth aspect through the fortieth aspect, wherein the instructions further cause the processor to perform operations including: generating a new TCI state switch delay configuration for the at least one UE, the new TCI state switch delay configuration generated in response to receipt of the beam-dependent scheduling offset message and the known status; and transmitting the new TCI state switch delay configuration to the at least one UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, chipsets including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:

a memory storing processor-readable code; and at least one processor coupled to the memory, the at least one processor configured to execute the processor-readable code to cause the at least one processor to:

receive a time domain resource allocation table including one or more default scheduling offsets for one of uplink communication or downlink communication;

receive a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table;

transmit a beam-dependent scheduling offset message to the network entity, the beam-dependent scheduling offset message being based on a processing state of the UE in an adaptive beamforming procedure;

generate a beam for one of the uplink communication or the downlink communication using one or more adaptive beam weights determined in the adaptive beamforming procedure; and perform the one of the uplink communication or the downlink communication using the beam at a beam-dependent scheduling offset, the beam-dependent scheduling offset corresponding to a time for the UE to complete the adaptive beamforming procedure from the processing state.

2. The UE of claim 1, wherein the beam-dependent scheduling offset message includes a minimum beam-dependent scheduling offset, the minimum beam-dependent scheduling offset is a minimum time calculated by the UE to complete the adaptive beamforming procedure from the processing state.

3. The UE of claim 1, wherein the beam-dependent scheduling offset message includes an indicator of the processing state of the UE in the adaptive beamforming procedure.

4. The UE of claim 1, wherein the processor-readable code further causes the at least one processor to:

identify a transmission configuration indicator (TCI) state associated with the one or more adaptive beam weights;

determine a known status of the TCI state by the UE, the known status being one of the TCI state is known to the UE or the TCI state is unknown to the UE; and transmit the known status of the TCI state to the network entity.

5. The UE of claim 4, wherein the processor-readable code further causes the at least one processor to:

receive from the network entity a new TCI state switch delay configuration associated with the adaptive beamforming procedure.

6. A network entity comprising:

a memory storing processor-readable code; and at least one processor coupled to the memory, the at least one processor configured to execute the processor-readable code to cause the at least one processor to:

transmit to at least one UE a time domain resource allocation table including one or more default scheduling offsets for one of uplink communication or downlink communication;

transmit a scheduling message to the at least one UE, the scheduling message identifying one of a downlink allocation and a corresponding default downlink scheduling offset from the time domain resource allocation table or an uplink grant and a corresponding default uplink scheduling offset from the time domain resource allocation table;

receive a beam-dependent scheduling offset message from the at least one UE;

determine a beam-dependent scheduling offset based on the beam-dependent scheduling offset message;

perform one of the uplink communication or the downlink communication using the beam-dependent scheduling offset; and receive, from the at least one UE, a known status of a transmission configuration indicator (TCI) state corresponding to adaptive beam weights generated by the at least one UE, the known status being one of the TCI state is known to the at least one UE or the TCI state is unknown to the at least one UE.

7. The network entity of claim 6, wherein the beam-dependent scheduling offset message is the beam-dependent scheduling offset.

8. The network entity of claim 6, wherein the beam-dependent scheduling offset message includes an indicator of a processing state of the at least one UE in an adaptive beamforming procedure.

9. The network entity of claim 6, wherein the processor-readable code further causes the at least one processor to:

generate a new TCI state switch delay configuration for the at least one UE, the new TCI state switch delay configuration generated in response to receipt of the beam-dependent scheduling offset message and the known status; and transmit the new TCI state switch delay configuration to the at least one UE.

10. A method of wireless communication performed by a user equipment (UE), the method comprising:

receiving a time domain resource allocation table including one or more default scheduling offsets for one of uplink communication or downlink communication;

receiving a scheduling message from a network entity, the scheduling message identifying one of a downlink allocation and a corresponding default downlink scheduling offset from the time domain resource allocation table or an uplink grant and a corresponding default uplink scheduling offset from the time domain resource allocation table;

transmitting a beam-dependent scheduling offset message to the network entity, the beam-dependent scheduling offset message being based on a processing state of the UE in an adaptive beamforming procedure;

generating a beam for one of the uplink communication or the downlink communication using one or more adaptive beam weights determined in the adaptive beamforming procedure; and performing the one of the uplink communication or the downlink communication using the beam at a beam-dependent scheduling offset, the beam-dependent scheduling offset corresponding to a time for the UE to complete the adaptive beamforming procedure from the processing state.

11. The method of claim 10, wherein the beam-dependent scheduling offset message includes a minimum beam-dependent scheduling offset, the minimum beam-dependent scheduling offset is a minimum time calculated by the UE to complete the adaptive beamforming procedure from the processing state.

12. The method of claim 10, wherein the beam-dependent scheduling offset message includes an indicator of the processing state of the UE in the adaptive beamforming procedure.

13. The method of claim 10, further including:

identifying a transmission configuration indicator (TCI) state associated with the one or more adaptive beam weights;

determining a known status of the TCI state by the UE, the known status being one of the TCI state is known to the UE or the TCI state is unknown to the UE; and transmitting the known status of the TCI state to the network entity.

14. The method of claim 13, further including:

receiving from the network entity a new TCI state switch delay configuration associated with the adaptive beamforming procedure.

* * * * *